US012695760B2

(12) United States Patent (10) Patent No.: US 12,695,760 B2
Ren et al. (45) Date of Patent: Jul. 28, 2026

(54) ACCESS CONTROL METHOD AND RELATED APPARATUS

(71) Applicant: Huawei Technologies Co., Ltd., Shenzhen (CN)

(72) Inventors: Bingfei Ren, Beijing (CN); Zhewen Mao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 18/547,636

(22) PCT Filed: Mar. 10, 2022

(86) PCT No.: PCT/CN2022/080161
§ 371 (c)(1),
(2) Date: Aug. 23, 2023

(87) PCT Pub. No.: WO2022/188839
PCT Pub. Date: Sep. 15, 2022

(65) Prior Publication Data
US 2024/0146740 A1 May 2, 2024

(30) Foreign Application Priority Data
Mar. 12, 2021 (CN) .......................... 202110272096.7

(51) Int. Cl.
H04L 9/40 (2022.01)
(52) U.S. Cl.
CPC .................................. H04L 63/107 (2013.01)

(58) Field of Classification Search
CPC ...................................................... H04L 63/107
See application file for complete search history.

(56) References Cited

U.S. PATENT DOCUMENTS

| 2008/0148350 A1* | 6/2008 | Hawkins ............. H04W 12/082 726/1 |
| 2015/0050922 A1 | 2/2015 | Ramalingam et al. |
| 2015/0074746 A1* | 3/2015 | Kohno .................. H04L 63/102 726/1 |
| 2018/0211026 A1* | 7/2018 | Gordon ............... G06F 13/4068 |
| 2020/0186538 A1* | 6/2020 | Koshal ................ H04L 61/2557 |
| 2021/0243595 A1* | 8/2021 | Buck ..................... G06F 21/604 |

(Continued)

FOREIGN PATENT DOCUMENTS

| CN | 109150866 A | 1/2019 |
| CN | 105850165 B | 4/2020 |

*Primary Examiner* — Harris C Wang
(74) *Attorney, Agent, or Firm* — Slater Matsil, LLP

(57) ABSTRACT

A method includes: an electronic device sends a sign-in request to enable a management party device to learn that the electronic device has entered a specific environment. The management party device selects one access policy from one or more stored access policies based on one or more of the following: restriction levels for the specific environment, restriction categories for functions of electronic devices in the specific environment, a device type or a login user of an electronic device, a time point at which the management party device receives the sign-in request, or an area in which the electronic device is located in the specific environment, and sends the access policy to the electronic device, to restrict a function of the electronic device.

20 Claims, 24 Drawing Sheets

(56)           References Cited

U.S. PATENT DOCUMENTS

2023/0232233 A1*    7/2023    Varampetran ......... H04W 12/69
                                                             726/1
2023/0353362 A1*   11/2023    Dyer ................... H04L 63/0861
2024/0146740 A1*    5/2024    Ren ........................... H04L 9/40

* cited by examiner

Electronic device 200

FIG. 3

User interface 21

User interface 31

User interface 21

User interface 21

User interface 41

User interface 41

User interface 41

User interface 41

User interface 21

User interface 41

User interface 51

Sign-in List

Mary

Lucy

Henry

Tom

Lily

David

Search

User interface 51

Sign-in List

Mary

Lucy

512

514

Execution-refused list

✕

David

Alice

Lily

Tom

Search

ACCESS CONTROL METHOD AND RELATED APPARATUS

CROSS-REFERENCE TO RELATED APPLICATIONS

This application is a National Stage of International Application No. PCT/CN2022/080161, filed on Mar. 10, 2022, which claims priority to Chinese Patent Application No. 202110272096.7, filed on Mar. 12, 2021. Both of the aforementioned applications are hereby incorporated by reference in their entireties.

TECHNICAL FIELD

This application relates to the field of terminals and communications technologies, and in particular, to an access control method and a related apparatus.

BACKGROUND

At present, electronic devices such as a mobile phone, a tablet, and a computer have gradually become portable products for people. When a user carrying an electronic device such as a mobile phone enters a specific place or area, a management party usually restricts functions of the electronic device that enters the specific environment, for example, no recording, no photographing, or no access to specific resources.

To restrict functions of the electronic device when the electronic device enters a specific environment, there is an existing solution that the management party notifies the user carrying the electronic device of an access requirement for the electronic device in the specific environment, and the user actively configures a corresponding policy to restrict the functions of the electronic device. However, the method can only be performed through management means. The management party requires the user to actively comply with the access requirement for the electronic device in the specific environment. This depends on the user's consciousness, and cannot totally ensure an execution effect of the user.

In other words, in a specific environment, how to ensure that an electronic device entering the specific environment can comply with a corresponding access requirement is an urgent problem to be resolved currently.

SUMMARY

This application provides an access control method and a related apparatus. According to the access control method, a user can directly obtain an access policy corresponding to a specific environment without performing complex operations, and a management party device may send different access policies for different electronic devices, to improve user experience.

According to a first aspect, an embodiment of this application provides an access control method. The method is applied to a communications system including a first device and a second device, and the method includes: The first device sends a first request to the second device; the second device selects a first access policy from a plurality of access policies based on one or more of the following: restriction levels set by the second device for a first environment, restriction categories for functions of electronic devices in the first environment, a device type or a login user of the first device, a time point at which the second device receives the first request, or an area in which the first device is located in the first environment; the second device sends the first access policy to the first device in response to the first request; and the first device receives the first access policy, and executes the first access policy, or refuses to execute the first access policy.

According to the method in the first aspect, the first device may be an electronic device of a user, and the second device may be an electronic device of a management party. That the first device sends a first request to the second device may mean that the first device performs sign-in, and the second device sends the first access policy to the first device in response to the first request. In this way, the first device can obtain an access policy for a specific environment through sign-in. In addition, the second device may select an access policy from the plurality of access policies in a plurality of manners, and send the access policy to the first device. In this way, when different electronic devices perform sign-in, different access policies may be obtained, to improve a management and monitoring effect of a management party device on the electronic device carried by the user, and improve user experience.

With reference to the first aspect, in an implementation, the first device generates a first access request used to perform a first function; and if the first device determines that functions that can be performed by the first device and that are indicated by the first access policy include the first function, the first device performs the first function; or if the first device determines that functions that cannot be performed by the first device and that are indicated by the first access policy include the first function, the first device refuses to perform the first function.

In other words, the first access policy may indicate the functions that can be performed by the first device or the functions that cannot be performed by the first device. When performing a function, the first device may determine, based on content indicated by the first access policy, whether the function is restricted, to implement a restriction imposed by the second device on the function of the first device.

With reference to the first aspect, in an implementation, the first device generates a second access request used to perform a second function; and if the first device determines that functions that can be performed by the first device and that are indicated by the first access policy include the second function, the first device refuses to perform the second function; or if the first device determines that functions that cannot be performed by the first device and that are indicated by the first access policy include the second function, the first device performs the second function.

With reference to the first aspect, in an implementation, after the first device receives the first access policy, and executes the first access policy, or refuses to execute the first access policy, the first device sends a second request to the second device in response to a received user operation; the second device sends first feedback information to the first device in response to the second request; or the second device sends first feedback information to the first device after first duration after sending the first access policy to the first device; and the first device deletes or disables the first access policy in response to the first feedback information; or the first access policy includes second duration or a first area, and the first device executes the first access policy within the second duration after receiving the first access policy or when the first device is located in the first area; and the first device deletes or disables the first access policy after the second duration after receiving the first access policy or when the first device is located outside the first area.

That is, the first device may remove a restriction imposed by the first access policy on the first device in two manners: active sign-out and automatic sign-out. The active sign-out means that after receiving a sign-out operation of the user, the first device sends a sign-out request to the second device, and after receiving feedback information from the second device, the first device deletes or disables the first access policy. The automatic sign-out means that the second device sends feedback information to the first device without a user operation, or when validity duration of an access policy reaches a specific threshold, and the first device leaves a range of a specific environment, the first device may automatically delete or disable the first access policy. In addition, the first device can perform sign-out only after receiving the first feedback information, to avoid a problem that the user self-removes a restriction on the access policy. In this way, the management party can better manage and monitor a sign-out status of an electronic device in the specific environment.

With reference to the first aspect, in an implementation, the second device stores a plurality of access policies, where the plurality of access policies include one or more of the following: access policies respectively corresponding to a plurality of restriction levels for the first environment; access policies respectively corresponding to a plurality of restriction categories of a function of the electronic device in the first environment; access policies respectively corresponding to a plurality of device types of electronic devices in the first environment, or access policies respectively corresponding to a plurality of login users of electronic devices in the first environment; access policies respectively corresponding to a plurality of time periods in the first environment; and access policies respectively corresponding to a plurality of areas in the first environment.

That is, the second device may configure a plurality of different access policies based on restriction factors such as a restriction level, a restriction category, a restriction target, restriction time, and a restriction range.

With reference to the first aspect, in an implementation, after the first device receives the first access policy, the first device receives a first user operation, and executes the first access policy in response to the first user operation; or after the first device receives the first access policy, the first device receives a second user operation, and refuses to execute the first access policy in response to the second user operation.

After receiving the first access policy, the first device may prompt the user, and finally determine, based on user selection, whether to execute the first access policy. This increases the user's choice over restrictions in the specific environment.

With reference to the first aspect, in an implementation, the first device sends an execution status of the first access policy to the second device, where the execution status of the first access policy includes: an executed state, and an execution-refused state; and when the execution status is the execution-refused state, the second device outputs information about the first device, or the second device sends first prompt information to the first device.

When the second device obtains the execution status of executing the access policy by the first device, and the first device refuses to execute the access policy, the second device prompts the first device or outputs the information about the first device, and the management party performs an operation such as oral warning, to improve an effect of executing the access policy by the electronic device.

With reference to the first aspect, in an implementation, the first request further carries information about a third device; the second device sends a second access policy to the first device; and the first device sends the second access policy to the third device. The second access policy and the first access policy are a same access policy, or the second access policy and the first access policy are different access policies.

The third device may be an electronic device associated with the first device, for example, a device that establishes a Bluetooth connection or a network connection to the first device, or a device that logs in to a same account as the first device. In this way, the second device can directly send the access policy to the third device through the first device without sign-in performed by the third device, to improve efficiency of managing and monitoring an electronic device in the specific environment by the second device, simplify user operations, and improve user experience.

With reference to the first aspect, in an implementation, the third device sends an execution status of executing the second access policy by the third device to the first device, where the execution status of the second access policy includes: an executed state, and an execution-refused state; the first device sends the execution status of the second access policy to the second device; and when the execution status of the second access policy is the execution-refused state, the second device outputs the information about the third device, or the second device sends second prompt information to the third device.

Similar to the first device, the second device can further receive, through the first device, the execution status of executing the access policy by the third device, and when the third device refuses to execute the access policy, the second device prompts the third device or outputs the information about the third device, and the management party performs an operation such as oral warning.

With reference to the first aspect, in an implementation, after the first device deletes or disables the first access policy, the first device notifies the third device to delete or disable the second access policy.

According to a second aspect, an embodiment of this application provides another access control method. The method is applied to a second device, and the method includes: The second device receives a first request sent by a first device; the second device selects a first access policy from a plurality of access policies based on one or more of the following: restriction levels set by the second device for a first environment, restriction categories for functions of electronic devices in the first environment, a device type or a login user of the first device, a time point at which the second device receives the first request, or an area in which the first device is located in the first environment; and the second device sends the first access policy to the first device in response to the first request.

In this way, for different electronic devices in a specific environment, the second device may send different access policies to restrict functions of the electronic devices, to enhance a management and monitoring effect of a management party on a user.

With reference to the second aspect, in an implementation, the second device receives the second request sent by the first device; and the second device sends first feedback information to the first device in response to the second request; or the second device sends first feedback information to the first device after first duration after sending the first access policy to the first device, where the first feedback information is used by the first device to delete or disable the first access policy.

In this way, the second device may remove a restriction on a function of the first device after receiving a sign-out request from the user, or remove a restriction on a function of the first device after a period of time after the first device receives the first access policy. In addition, the first device can perform sign-out only after receiving the first feedback information, to avoid a problem that the user self-removes a restriction on the access policy. In this way, the management party can better manage and monitor a sign-out status of an electronic device in the specific environment.

With reference to the second aspect, in an implementation, the second device stores a plurality of access policies, where the plurality of access policies include one or more of the following: access policies respectively corresponding to a plurality of restriction levels for the first environment; access policies respectively corresponding to a plurality of restriction categories for functions of electronic devices in the first environment; access policies respectively corresponding to a plurality of device types of electronic devices in the first environment, or access policies respectively corresponding to a plurality of login users of electronic devices in the first environment; access policies respectively corresponding to a plurality of time periods in the first environment; and access policies respectively corresponding to a plurality of areas in the first environment.

That is, the second device may configure a plurality of different access policies based on restriction factors such as a restriction level, a restriction category, a restriction target, restriction time, and a restriction range.

With reference to the second aspect, in an implementation, the second device receives an execution status of the first access policy sent by the first device, where the execution status of the first access policy includes: an executed state, and an execution-refused state; and when the execution status is the execution-refused state, the second device outputs information about the first device, or the second device sends first prompt information to the first device.

When the second device obtains the execution status of executing the access policy by the first device, and the first device refuses to execute the access policy, the second device prompts the first device or outputs the information about the first device, and the management party performs an operation such as oral warning, to improve an effect of executing the access policy by the electronic device.

With reference to the second aspect, in an implementation, the first request further carries information about a third device, and the second device sends a second access policy to the third device through the first device. The second access policy and the first access policy are a same access policy, or the second access policy and the first access policy are different access policies.

In this way, the second device can directly send the access policy to the third device through the first device without sign-in performed by the third device, to accelerate management and monitoring of the second device on the electronic device that enters a specific environment.

With reference to the second aspect, in an implementation, after the second device sends the second access policy to the third device through the first device, the second device receives an execution status that is of executing the second access policy by the third device and that is obtained by the first device, and the execution status of the second access policy includes: an executed state, and an execution-refused state; and when the execution status of the second access policy is the execution-refused state, the second device outputs the information about the third device, or the second device sends second prompt information to the third device.

Similar to the first device, the second device can further receive, through the first device, the execution status of executing the access policy by the third device, and when the third device refuses to execute the access policy, the second device prompts the third device or outputs the information about the third device, and the management party performs an operation such as oral warning.

According to a third aspect, an embodiment of this application provides an electronic device. The electronic device includes: a memory and one or more processors. The memory is coupled to the one or more processors, the memory is configured to store computer program code, the computer program code includes computer instructions, and the one or more processors invoke the computer instructions to enable a computer to perform the following operations: receiving a first request sent by a first device; selecting a first access policy from a plurality of access policies based on one or more of the following: restriction levels set by the second device for a first environment, restriction categories for functions of electronic devices in the first environment, a device type or a login user of the first device, a time point at which the second device receives the first request, or an area in which the first device is located in the first environment; and sending the first access policy to the first device in response to the first request.

In this way, the electronic device restricts different functions of different electronic devices in a specific environment, to enhance a management and monitoring effect of a management party on a user.

With reference to the third aspect, in an implementation, the one or more processors are further configured to invoke the computer instructions to enable the computer to perform the following operations: receiving a second request sent by the first device; and sending first feedback information to the first device in response to the second request; or sending first feedback information to the first device after first duration after sending the first access policy to the first device, where the first feedback information is used by the first device to delete or disable the first access policy In this way, the first device can perform sign-out only after receiving the first feedback information, to avoid a problem that the user self-removes a restriction on the access policy.

With reference to the third aspect, in an implementation, the memory stores a plurality of access policies, where the plurality of access policies include one or more of the following: access policies respectively corresponding to a plurality of restriction levels for the first environment; access policies respectively corresponding to a plurality of restriction categories for functions of electronic devices in the first environment; access policies respectively corresponding to a plurality of device types of electronic devices in the first environment, or access policies respectively corresponding to a plurality of login users of electronic devices in the first environment; access policies respectively corresponding to a plurality of time periods in the first environment; and access policies respectively corresponding to a plurality of areas in the first environment.

That is, the electronic device may configure a plurality of different access policies based on restriction factors such as a restriction level, a restriction category, a restriction target, restriction time, and a restriction range.

With reference to the third aspect, in an implementation, the one or more processors are further configured to invoke the computer instructions to enable the computer to perform the following operations: receiving an execution status of the first access policy sent by the first device, where the execution status of the first access policy includes: an executed state, and an execution-refused state; and when the execution status is the execution-refused state, outputting information about the first device, or sending first prompt information to the first device.

That is, the electronic device may monitor and manage an execution status of executing the access policy by a device in a specific environment, and the management party may immediately remind the user to comply with an access requirement for the specific environment.

With reference to the third aspect, in an implementation, the first request further carries information about a third device; and after the first access policy is sent to the first device, the one or more processors are further configured to invoke the computer instructions to enable the computer to perform the following operation: sending a second access policy to the third device through the first device, where the second access policy and the first access policy are a same access policy, or the second access policy and the first access policy are different access policies.

With reference to the third aspect, in an implementation, after the second access policy is sent to the third device through the first device, the one or more processors are further configured to invoke the computer instructions to enable the computer to perform the following operations: receiving an execution status that is of executing the second access policy by the third device and that is obtained by the first device, and the execution status of the second access policy includes: an executed state, and an execution-refused state; and when the execution status of the second access policy is the execution-refused state, outputting the information about the third device, or sending second prompt information to the third device.

According to a fourth aspect, an embodiment of this application provides a computer-readable storage medium. The computer-readable storage medium includes instructions, and when the instructions are run on an electronic device, the electronic device is enabled to perform the method according to any one of the second aspect or the implementations of the second aspect.

According to a fifth aspect, an embodiment of this application provides a computer program product. When the computer program product is run on a computer, the computer is enabled to perform the method according to any one of the second aspect or the implementations of the second aspect.

According to the technical solutions provided in embodiments of this application, the electronic device can directly obtain an access policy corresponding to a specific environment without performing complex operations. In addition, the management party device may select different access policies based on information about different electronic devices, or the management party device may formulate an access policy for a specific environment. For different electronic devices in a specific environment, the management party device may restrict different functions of the different electronic devices, to improve a management and monitoring effect of the management party on the electronic device carried by the user.

BRIEF DESCRIPTION OF THE DRAWINGS

FIG. 3 is a diagram of a hardware structure of an electronic device 200 according to an embodiment of this application;

FIG. 6A to FIG. 6F show another group of user interfaces according to an embodiment of this application;

DETAILED DESCRIPTION OF ILLUSTRATIVE EMBODIMENTS

Figure 1:
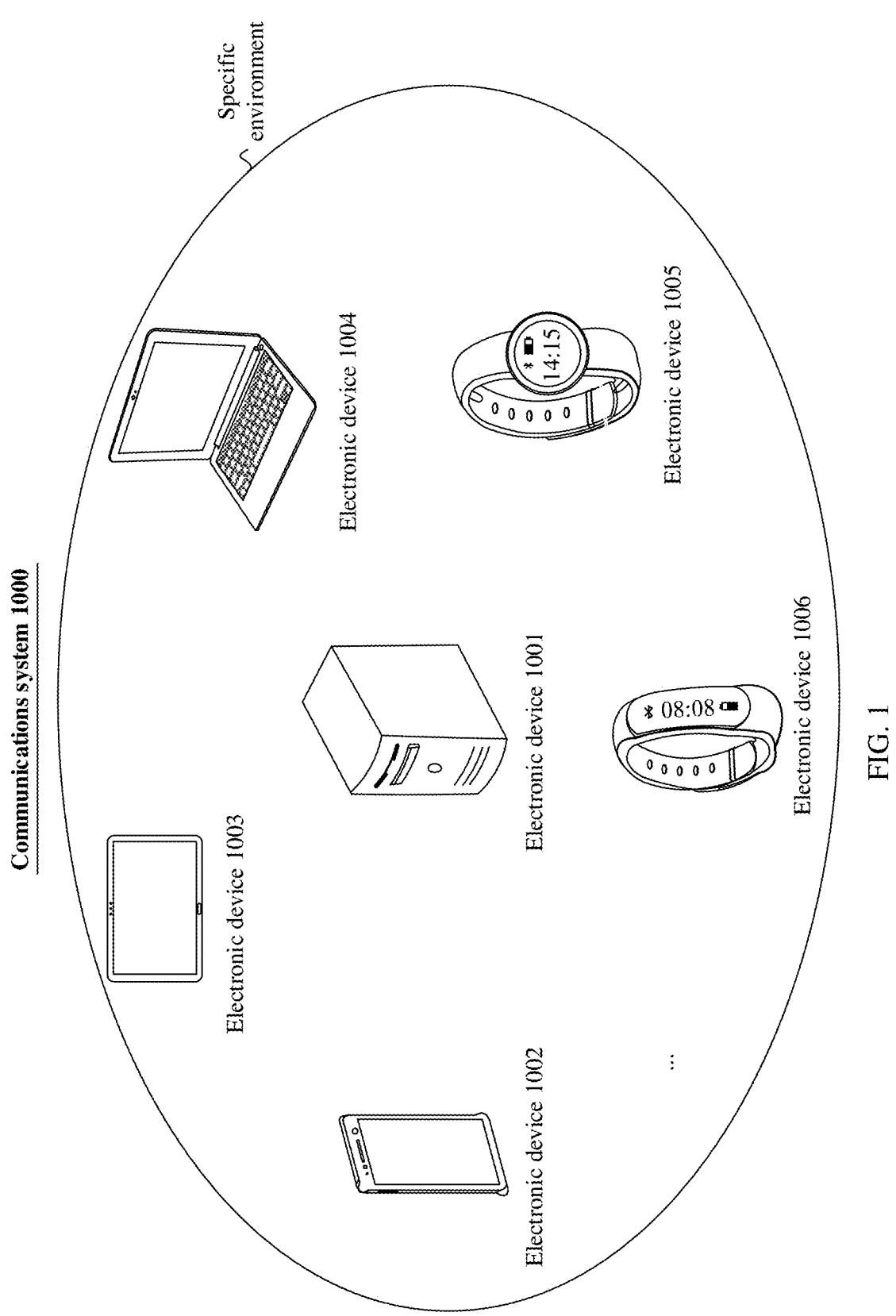
FIG. 1 is a schematic diagram of a structure of a communications system 1000 according to an embodiment of this application.

The technical solutions according to embodiments of this application are clearly and completely described in the following with reference to the accompanying drawings. In descriptions of embodiments of this application, "/" indicates "or" unless otherwise stated. For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The term "user interface (user interface, UI)" in the following embodiments of this application is a medium interface for interaction and information exchange between an application or an operating system and a user. The user interface implements conversion between an internal form of information and a form acceptable to the user. The user interface is source code written in a specific computer language such as Java or an extensible markup language (extensible markup language, XML). Interface source code is parsed and rendered on an electronic device, and is finally presented as content that can be identified by the user. The user interface is usually represented in a form of a graphical user interface (graphic user interface, GUI), and is a user interface that is related to a computer operation and that is displayed in a graphical manner. The user interface may be a visual interface element such as a text, an icon, a button, a menu, a tab, a text box, a dialog box, a status bar, a navigation bar, or a widget that is displayed in a display of an electronic device.

For ease of understanding, the following describes related terms and concepts in embodiments of this application.

(1) Specific Environment

The specific environment is a place or area such as a conference room, a classroom, or a library that has some restrictions on functions of an electronic device. The restrictions on the functions of the electronic device are access restrictions on a resource, data, a capability, and the like of the electronic device. For example, the restrictions may be restrictions on an application such as photographing, video recording, voice recording, music, and a game in the electronic device, or may be restrictions on a network access status, a power-on/off status, a call status, and the like of the electronic device.

The specific environment may be a range-restricted area, for example, a range in which a company is located, or may be a scenario, for example, a conference room during a conference.

A restriction range, a restriction level, a restriction target, restriction content, restriction time, and the like for the specific environment may be preset. For specific descriptions of the specific environment, refer to subsequent embodiments.

(2) Access Requirement

The access requirement is an access requirement corresponding to a specific environment, and is a requirement that a user who enters the specific environment needs to comply with when using an electronic device. The access requirement may be set by a management party.

The user may obtain the access requirement by using an oral statement by the management party, a signed non-disclosure agreement, and conference attendance notice terms.

The access requirement may indicate any one or more of the following:

1. Restricted Functions of the Electronic Device

The restricted functions of the electronic device are functions that are not allowed to be performed by the electronic device.

For example, when an employee enters a conference room with a confidentiality requirement for a conference, the management party prohibits the employee from using functions such as photographing, video recording, and voice recording of a mobile phone, to prevent disclosure of a business secret involved in the conference. Alternatively, when a visitor enters an antique museum, the management party requires the visitor not to use a mobile phone to take a photo, to achieve an effect of protecting cultural relics.

2. Executable Functions of the Electronic Device

The executable functions of the electronic device are functions that are allowed to be performed by the electronic device.

For example, when a student carries a mobile phone to join a class, a teacher requires the student to use only applications (such as a document, a browser, and a teaching guidance application) related to the class, to ensure teaching discipline and a learning effect during the class. Alternatively, when a customer enters a place such as a bookstore or an art exhibition, the management party requires the customer to use only an application that has no sound or relatively small sound from a speaker, or requires that a speaker volume be less than a threshold when the user uses a terminal, to ensure civilized etiquette in a public place.

(3) Access Policy

The access policy is an access policy corresponding to a specific environment, and is a requirement that needs to be complied with by an electronic device that enters the specific environment. The access policy may be set by a management party device.

The access policy is the same as the access requirement, and both may indicate any one or more of the following: 1. a restricted function of the electronic device; and 2. an executable function of the electronic device. For specific descriptions of the restricted function and the executable function of the electronic device, refer to related descriptions in the access requirement.

A difference is that the access policy and the access requirement are in different forms. The access requirement is a form understandable to the user, and the access policy is a form understandable to the electronic device, for example, instructions or code. The electronic device may obtain the access policy by scanning QR code, establishing a connection to the management party device, or the like.

(4) Access Request

The access request is a request instruction that is generated by the electronic device and that is used to access a resource, data, a capability, or the like.

The access request may have the following two cases:

1. A request generated by the electronic device in response to a user operation. For example, when the electronic device receives a user operation of tapping a camera function, the electronic device generates an access request for the camera function.

2. A request autonomously generated by the electronic device. For example, when initiating caller ID display, the electronic device generates an access request for turning on a speaker.

(5) Sign-In

Sign-in means that an electronic device sends a sign-in request to a management party device, where the sign-in request carries an identifier of the electronic device, and the management party device can learn, based on the sign-in request, that the electronic device has entered a specific environment.

The sign-in may include but is not limited to the following manners:

1. Manual Sign-In

The electronic device may complete sign-in by using a sign-in application, verification information, or the like. Specifically, an application with a sign-in function may be installed in the electronic device, and the electronic device may complete sign-in by using the sign-in function; the management party device may provide verification information used by the user for sign-in, for example, QR code, an account, or verification code, and the user may complete sign-in by scanning the QR code, logging in to the account, entering the verification code, or the like; or the management party may provide a sensing device used by the user for sign-in, and the electronic device may communicate with the sensing device by using, for example, a near field communication technology, to complete sign-in.

2. Automatic Sign-In

The electronic device may automatically complete sign-in in a positioning manner such as a GPS, Bluetooth, or a Wi-Fi hotspot. For example, when the electronic device is located in a specific environment managed and monitored by the management party device, the electronic device is connected to Bluetooth or a Wi-Fi hotspot in the specific environment managed and monitored by the management party device, and the electronic device automatically completes sign-in.

(6) Sign-Out

Sign-out means that a management party device sends sign-out feedback information to an electronic device, and the electronic device performs sign-out based on the information, or an access policy becomes invalid, and a function of the electronic device is no longer restricted by the specific environment.

The sign-out may include but is not limited to the following manners:

1. Manual Sign-Out

Before the electronic device receives the sign-out feedback information sent by the management party device, the electronic device further sends a sign-out request to the management party device, in other words, the electronic device actively initiates the sign-out request. The electronic device may complete sign-out by using a sign-in application, verification information, or the like.

That is, active sign-out means that the electronic device initiates sign-out, and the electronic device may notify the management party device that the electronic device has left a specific environment, and may request not to be restricted by the management party device.

2. Automatic Sign-Out

Automatic sign-out means that the electronic device does not need to actively initiate a sign-out request to the management party device, and the management party device directly sends sign-out feedback information to the electronic device, or an access policy executed by the electronic device automatically becomes invalid. For example, when the management party device detects that duration in which the electronic device obtains an access policy reaches a specific value, the management party device actively sends the sign-out feedback information to the electronic device. For another example, the access policy carries valid duration, and when duration in which the electronic device obtains the access policy reaches the valid duration, the electronic device automatically signs out; or the access policy carries a valid area, and when the electronic device leaves a restriction range of the valid area, the electronic device automatically signs out.

That is, the user does not need to be aware of automatic sign-out. The sign-out may be initiated by the management party device, and the management party device notifies the electronic device that the electronic device may be no longer restricted by the management party device, or sign-out time may be determined by the access policy executed by the electronic device.

When a user carrying an electronic device enters a specific environment, a management party usually restricts functions of the electronic device that enters the specific environment.

Restricting the functions of the electronic device means that some or all functions of the electronic device are restricted for use.

Restricting the functions of the electronic device may include but is not limited to the following two cases:

1. Indicate functions that cannot be performed by the electronic device.

2. Indicate functions that can be performed by the electronic device.

The management party may restrict the functions of the electronic device in the specific environment through the user's consciousness. For example, the management party may temporarily confiscate the electronic device of the user, or require the user to power off the electronic device. However, in the specific environment, if the user needs to use a function of the electronic device, or the electronic device stores data required by the user, the management party cannot restrict the functions of the electronic device in the foregoing manner. For another example, the management party may notify the user of an access requirement for the specific environment, and the user configures a corresponding access policy based on the access requirement. However, this requires the user to have security and privacy knowledge, to configure an access policy.

To ensure that the functions of the electronic device are restricted by the specific environment after the electronic device enters the specific environment, an embodiment of this application provides an access control method. In the access control method, a management party device may be disposed in a specific environment, and the management party device may store one or more access policies. After learning that an electronic device enters the specific environment, the management party device may select one access policy from the one or more stored access policies and send the access policy to the electronic device. After receiving the access policy for the specific environment, the electronic device may directly execute the access policy for the specific environment without user confirmation, or the electronic device may prompt a user whether to execute the access policy for the specific environment, and execute the access policy for the specific environment after user confirmation.

That the electronic device executes the access policy for the specific environment means that the electronic device refuses to execute a restricted function corresponding to the access policy for the specific environment, or the electronic device can execute only an executable function corresponding to the access policy for the specific environment.

The access policy may restrict a function of the electronic device. A same access policy may exist in different specific environments. A plurality of access policies may exist in a same specific environment, and the plurality of access policies may be access policies in different time periods for the specific environment, or may be access policies for different users. For specific descriptions of the access policy, refer to subsequent embodiments.

In some embodiments, the management party device may learn, through sign-in performed by the electronic device, that the electronic device has entered a specific environment managed and monitored by the management party device, and send an access policy corresponding to the specific environment to the electronic device.

In some embodiments, after the electronic device obtains the access policy for the specific environment, if the electronic device refuses to execute the access policy for the specific environment, the electronic device may execute either of the following: 1. prompting the user to execute the access policy for the specific environment; and 2. notifying the management party device that the electronic device currently refuses to execute the access policy for the specific environment.

In some embodiments, when learning that the electronic device refuses to execute the access policy for the specific environment, the management party device may send prompt information to the electronic device again, and the prompt information is used to trigger the electronic device to prompt the user to execute the access policy for the specific environment.

In some embodiments, when learning that the electronic device refuses to execute the access policy for the specific environment, the management party device may output information about the electronic device, and therefore a management staff performs a further operation, for example, oral warning.

According to the access control method provided in this embodiment of this application, the user can directly obtain the access policy corresponding to the specific environment without performing complex operations, and comply with the access requirement for the specific environment. For electronic devices carried by different users, the management party may select different access requirements. In addition, the management party may monitor and manage execution statuses of access policies by electronic devices that enter the specific environment, to improve a management and monitoring effect of the management party on the electronic devices carried by the users.

First, a communications system 1000 provided in an embodiment of this application is described.

FIG. 1 shows an example of an architecture of the communications system 1000.

As shown in FIG. 1, the communications system 1000 may include one or more electronic devices, for example, electronic devices 1001 to 1006.

The electronic device in the embodiments of this application may be a portable terminal device, such as a mobile phone, a tablet computer, or a wearable device, using iOS, Android, Microsoft, or another operating system, or may be a non-portable terminal device such as a laptop computer (laptop) with a touch-sensitive surface or a touch panel, or a desktop computer with a touch-sensitive surface or a touch panel. For example, in the example shown in FIG. 1, the electronic device 1001 is a server, and the electronic devices 1002 to 1006 are respectively a mobile phone, a tablet, a notebook computer, a smart watch, and a smart band.

For example, the electronic device 1001 is configured to deploy a range of a specific environment and an access policy for the specific environment, establish a connection to electronic devices (for example, the electronic devices 1002 to 1006) in the specific environment, and send the access policy to the electronic devices in the specific environment, to manage and monitor functions of the electronic devices in the specific environment.

For example, the electronic devices 1002 to 1006 all may receive, store, and execute the access policy.

Access control between the electronic device 1001 and the electronic device 1002 is used as an example for description.

The electronic device 1001 deploys a range of a specific environment and an access policy for the specific environment. When the electronic device 1002 enters or is in the specific environment, the electronic device 1002 receives the access policy that is for the specific environment and that is sent by the electronic device 1001. When the electronic device 1002 needs to perform a function, the electronic device 1002 first checks whether the function is in restricted functions of the electronic device described by the access policy. If yes, the electronic device 1002 refuses to perform the function; or if no, the electronic device 1002 performs the function. Alternatively, the electronic device first checks whether the function is in executable functions of the electronic device described by the access policy, and if yes, the electronic device refuses to perform the function; or if no, the electronic device performs the function. In addition, the electronic device 1001 can further monitor a status of executing the access policy by the electronic device 1002. If the electronic device 1002 refuses to execute the access policy for the specific environment, the electronic device 1001 may send information again, to prompt the electronic device to execute the access policy. Finally, when the electronic device 1002 leaves the specific environment, the electronic device 1002 may delete or disable the access policy.

It may be understood that the electronic devices 1001 to 1006 may be other types of electronic devices. This is not limited in this application. One specific environment may include a plurality of electronic devices configured to manage and monitor specific areas, for example, the electronic device 1001, or may include a plurality of electronic devices that enter the specific environment, for example, the electronic devices 1002 to 1006. This is not limited in this application.

The following describes a hardware structure of an electronic device 100 provided in this embodiment of this application.

The electronic device 100 may be any electronic device in the communications system 1000 shown in FIG. 1, for example, the electronic devices 1002 to 1006.

Figure 2:
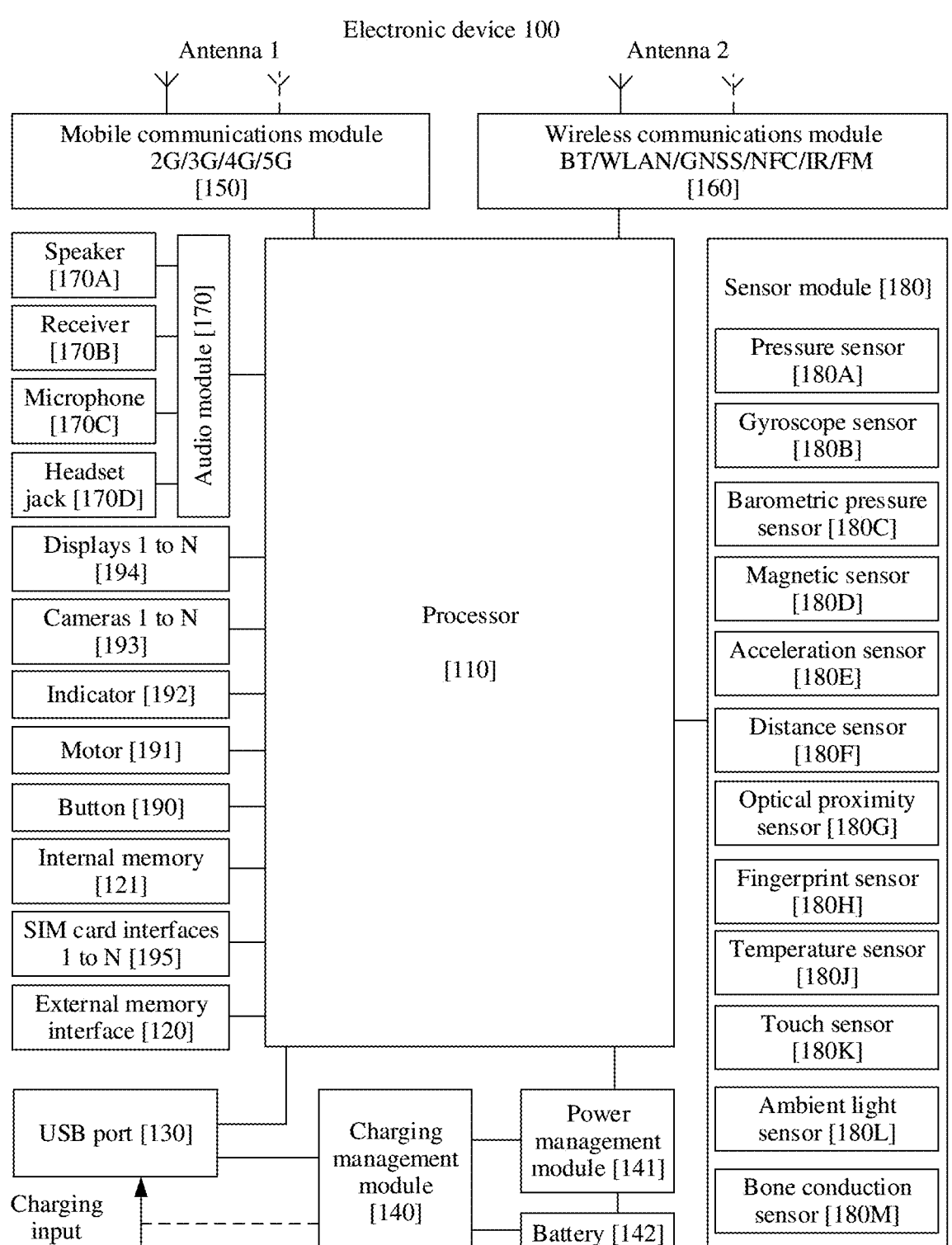
FIG. 2 is a diagram of a hardware structure of an electronic device 100 according to an embodiment of this application.

As shown in FIG. 2, the electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

In some embodiments, the processor may be configured to determine, based on an access policy, whether to accept or refuse an access request, and determine sign-out time based on the access policy. For details in which the electronic device 100 determines, based on an access policy, whether to accept or refuse the access request, and determine sign-out time based on the access policy, refer to subsequent embodiments. Details are not described herein again.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor no is a cache memory. The memory may store instructions or data that has been used or cyclically used by the processor 110. If the processor no needs to use the instructions or the data again, the processor may directly invoke the instructions or the data from the memory. This avoids repeated access, reduces waiting time of the processor 110, and improves system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the electronic device 100 may be implemented by using the antenna 1, the antenna 2, the mobile communications module iso, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor no. In some embodiments, at least some functional modules in the mobile communications module 150 may be disposed in a same device as at least some modules of the processor no.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor no, and is disposed in a same device as the mobile communications module 150 or another functional module.

The wireless communications module 160 may provide a wireless communication solution that is applied to the electronic device 100 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave by the antenna 2, performs demodulation and filtering processing on an electromagnetic wave signal, and sends a processed signal to the processor no. The wireless communications module 160 may further receive a to-be-sent signal from the processor no, perform frequency modulation and amplification on the signal, and convert the signal into an electromagnetic wave for radiation through the antenna 2.

In some embodiments, the mobile communications module 150 and the wireless communications module 160 may be configured to communicate with another electronic device (for example, a management party device). Communication between the electronic device 100 and the management party device is used as an example. The mobile communications module 150 and the wireless communications module 160 may be configured to establish a connection to the management party device, send a sign-in request to the management party device, receive an access policy sent by the management party device, send a sign-out request to the management party device, receive sign-out feedback information sent by the management party device, and the like.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS). In some embodiments, the electronic device 100 may obtain location information of the electronic device 100 by using the GPS.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor no may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

In some embodiments, the display 194 may be configured to display a user interface provided by the electronic device 100, for example, sign-in and sign-out of the electronic device 100, and a user interface involved when a function is restricted. For details, refer to a user interface provided in subsequent embodiments.

The camera 193 is configured to capture a static image or a video. An optical image of an object is generated through a lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

In some embodiments, the camera 193 may be configured to recognize QR code used during sign-in.

The internal memory 121 may include one or more random access memories (random access memory, RAM) and one or more non-volatile memories (non-volatile memory, NVM).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is generally referred to as a DDR5 SDRAM), and the like. The nonvolatile memory may include a magnetic disk storage device, a flash memory (flash memory), and the like.

The flash memory may be classified, based on an operation principle, into an NOR flash, an NAND flash, a 3D NAND flash, and the like; may be classified, based on a quantity of electric potential levels of a cell, into a single-level cell (single-level cell, SLC), a multi-level cell (multi-level cell, MLC), a triple-level cell (triple-level cell, TLC), a quad-level cell (quad-level cell, QLC), and the like; or the flash memory may be classified, based on storage specifications, into a universal flash storage (English: universal flash storage, UFS), an embedded multimedia memory (embedded multi media Card, eMMC), and the like.

The random access memory may be directly read and written by using the processor 110. The random access memory may be configured to store an executable program (for example, machine instructions) in an operating system or another running program, and may be further configured to store data of a user, data of an application, and the like.

The nonvolatile memory may also store an executable program, data of a user, data of an application, and the like, which may be loaded into the random access memory in advance for directly reading and writing by the processor 110.

In some embodiments, the internal memory 121 may be configured to store an access policy. The access policy may include but is not limited to the following two cases: 1. an access policy sent by the management party device after the electronic device 100 signs in; and 2. an access policy previously stored locally, where the access policy previously stored locally may include an access policy obtained through previous sign-in of the electronic device 100, or may include an access policy configured in the electronic device 100. For specific content of the access policy, refer to subsequent embodiments.

The electronic device 100 may implement audio functions, for example, music playing and recording, through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may alternatively be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device 100 at a location different from that of the display 194.

The button 190 includes a power button, a volume button, and the like. The button 190 may be a mechanical button, or may be a touch-sensitive button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

Figure 3:
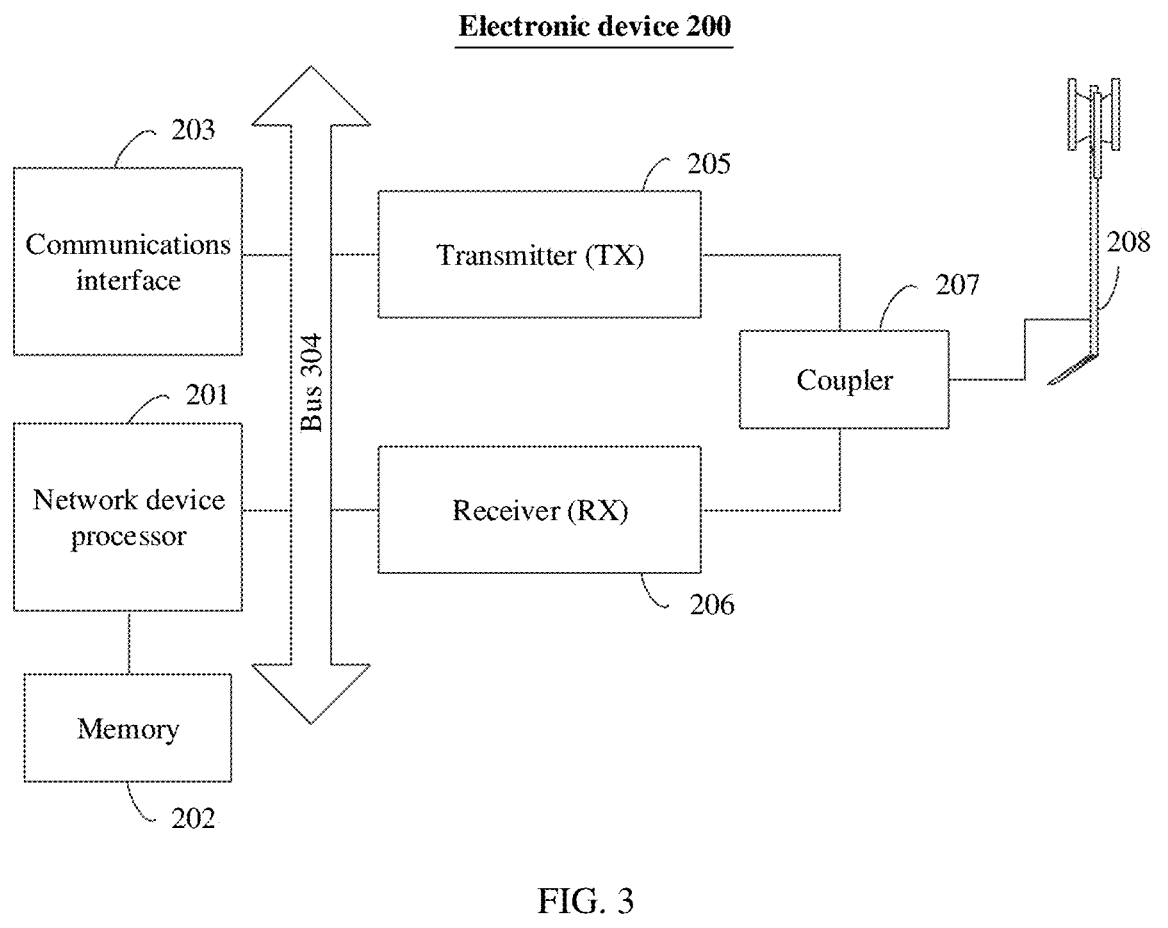

FIG. 3 is a diagram of a hardware structure of an electronic device 200 according to an embodiment of this application.

The electronic device 200 may be the electronic device 1001 in the communications system 1000 shown in FIG. 1.

As shown in FIG. 3, the electronic device 200 may include one or more processors 201, a memory 202, a communications interface 203, a transmitter 205, a receiver 206, a coupler 207, and an antenna 208. These components may be connected by using a bus 204 or in another manner. In FIG. 3, for example, the components are connected by using the bus.

The communications interface 203 may be configured for communication between the electronic device 200 and another communications device, for example, the electronic devices 1002 to 1006. Specifically, the communications interface 203 may be a 3G communications interface, a long term evolution (LTE) (4G) communications interface, a 5G communications interface, a WLAN communications interface, a WAN communications interface, or the like. Not limited to being provided with a wireless communication interface, the network device 300 may be further provided with a wired communications interface 203 to support wired communication, for example, a backhaul link between the electronic device 200 and another server may be a wired communication connection.

In some embodiments of this application, the transmitter 205 and the receiver 206 may be considered as a wireless modem. The transmitter 205 may be configured to perform transmission processing on a signal output by the processor 201. The receiver 206 is configured to receive a signal. The electronic device 200 may include one or more transmitters 205 and one or more receivers 206. The antenna 208 may be configured to convert electromagnetic energy in a transmission line into an electromagnetic wave in free space, or convert an electromagnetic wave in the free space into electromagnetic energy in the transmission line. The coupler 207 may be configured to split a mobile communication signal into a plurality of signals, and allocate the plurality of signals to a plurality of receivers 206. It may be understood that the antenna 208 of the network device may be implemented as a large-scale antenna array.

In some embodiments, the transmitter 205 may be configured to send an access policy, sign-out feedback information, prompt information prompting the user to execute the access policy, and the like.

In some embodiments, the receiver 206 may be configured to receive a sign-in request, a sign-out request, an execution status of the access policy, and the like.

The memory 202 is coupled to the processor 201, and is configured to store various software programs and/or a plurality of sets of instructions. Specifically, the memory 202 may include a high-speed random access memory, or a non-volatile memory, for example, one or more disk storage devices, a flash memory device, or another non-volatile solid-state storage device.

The memory 202 may store an operating system (briefly referred to as a system below), for example, an embedded operating system such as uCOS, VxWorks, or RTLinux. The memory 202 may further store a network communication program. The network communication program may be used to communicate with one or more electronic devices and one or more servers that provide a printing/screen projection/projection service.

In this embodiment of this application, the memory 202 may be configured to store one or more access policies and a policy rule for selecting one access policy from the plurality of access policies. For specific content of the policy rule and storing the one or more access policies, refer to subsequent embodiments.

In this embodiment of this application, the processor 201 may be configured to read and execute computer-readable instructions. Specifically, the processor 201 may be configured to invoke a program stored in the memory 202, for example, a program for implementing, on the electronic device 200 side, access policy configuration provided in one or more embodiments of this application, and execute instructions included in the program.

It should be noted that the electronic device 200 shown in FIG. 3 is merely an implementation of this embodiment of this application. In actual application, the electronic device 200 may further include more or fewer components. This is not limited herein.

The following describes, with reference to FIG. 4A to FIG. 4I, examples of a group of user interfaces implemented on an electronic device 100.

In the user interfaces shown in FIG. 4A to FIG. 4I, for example, the electronic device 100 runs a social application.

Figure 4A:
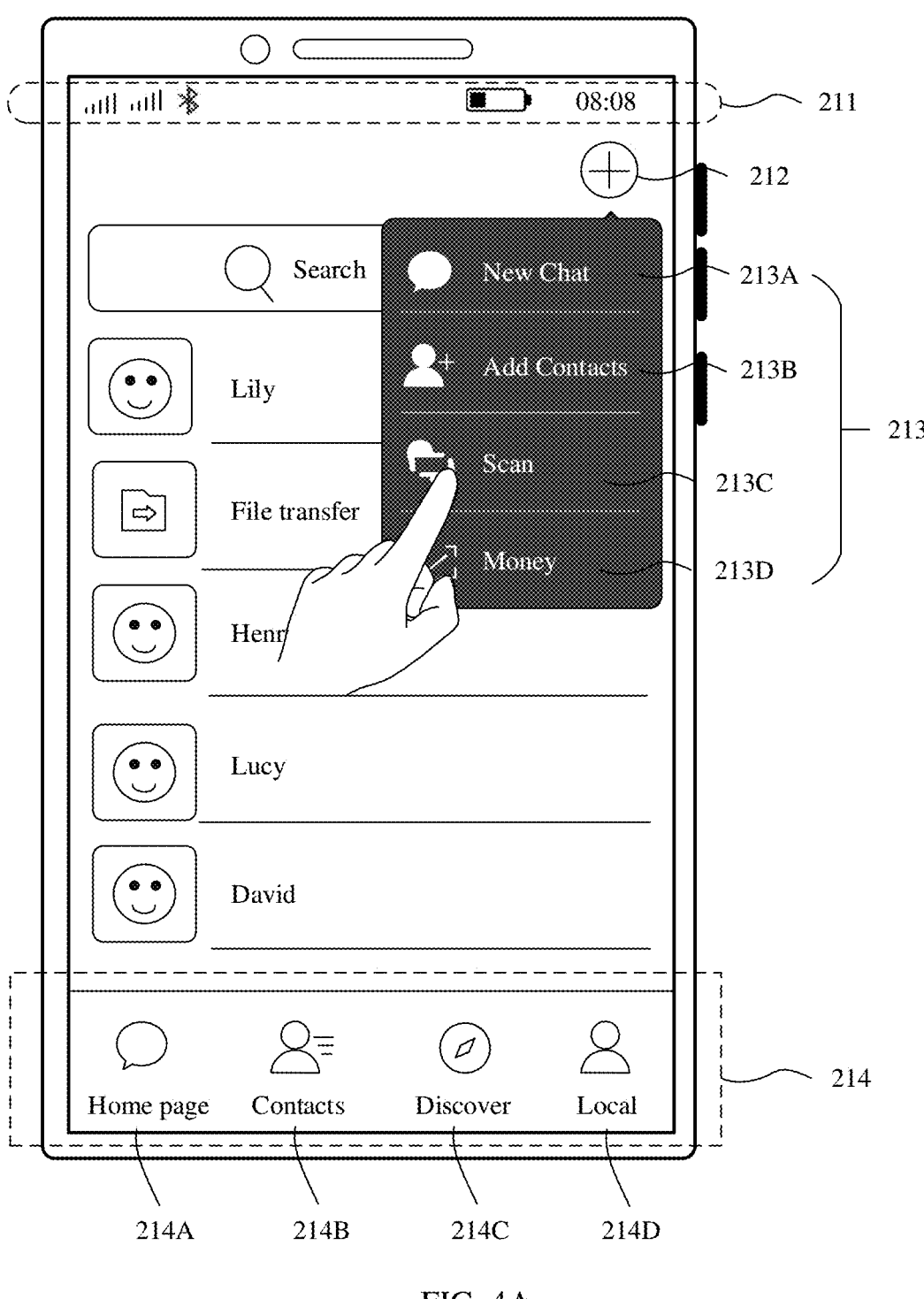
FIG. 4A to FIG. 4I show a group of user interfaces according to an embodiment of this application.

FIG. 4A shows an example of a default user interface 21 displayed when the electronic device 100 starts the social application.

As shown in FIG. 4A, the user interface 21 includes a status bar 211, a More option 212, a first menu bar 213, and a second menu bar 214.

The status bar 211 may include one or more signal strength indicators of mobile communication signals, a battery status indicator, and a time indicator.

The More option 212 may be used to display the first menu bar 213, that is, the electronic device 100 may detect a touch control operation performed on the More option 212 by a user, and the electronic device 100 displays the first menu bar 213 in response to the operation.

The first menu bar 213 includes a "New Chat" control 213A, an "Add Contacts" control 213B, a "Scan" control 213C, and a "Money" control 213D.

The "New Chat" control 213A may be used to monitor a user operation that triggers a multi-party chat function. The electronic device 100 may detect a user operation performed on the "New Chat" control 213A. The electronic device 100 may display, in response to the operation, a user interface for initiating a group chat, and the user may select a plurality of friends to initiate the multi-party chat function.

The "Add Contacts" control 213B may be used to monitor a user operation that triggers adding of a social friend. The electronic device 100 may detect a user operation performed on the "Add Contacts" control 213B. The electronic device 100 may display, in response to the operation, a user interface for adding a social friend, and the user may search for a contact based on a WeChat ID, or the user may add a social friend through QR code scanning, phone contacts, and the like.

The "Scan" control 213C may be used to monitor a user operation that triggers enabling of a camera function to scan an image. The electronic device 100 may detect a user operation performed on the "Scan" control 213C. The electronic device 100 may display, in response to the operation, a user interface 310 shown in FIG. 4B, and the user may implement functions such as Scan, Recognize, and Translate through the interface.

The "Money" control 213D may be used to monitor a user operation that triggers display of payment. The electronic device 100 may detect a user operation performed on the "Money" control 213D. The electronic device 100 may display, in response to the operation, an interface for displaying payment, and the user may complete electronic payment through the interface.

The second menu bar 214 includes a "Home page" control 214A, a "Contacts" control 214B, a "Discover" control 214C, and a "Local" control 214D.

The "Home page" control 214A may be used to switch to the default user interface 21 of the application. The "Contacts" control 214B may be used to switch to the Contacts interface, and the interface is used to display a social friend list added by the user. The "Discover" control 214C may be used to switch to the Discovery interface, and the interface is used to display other functions (such as shopping, entertainment, and search) of the application. The "Local" control 214D may be used to switch to an interface for managing a user account, and the interface is used to display local information about the user.

Figure 4B:
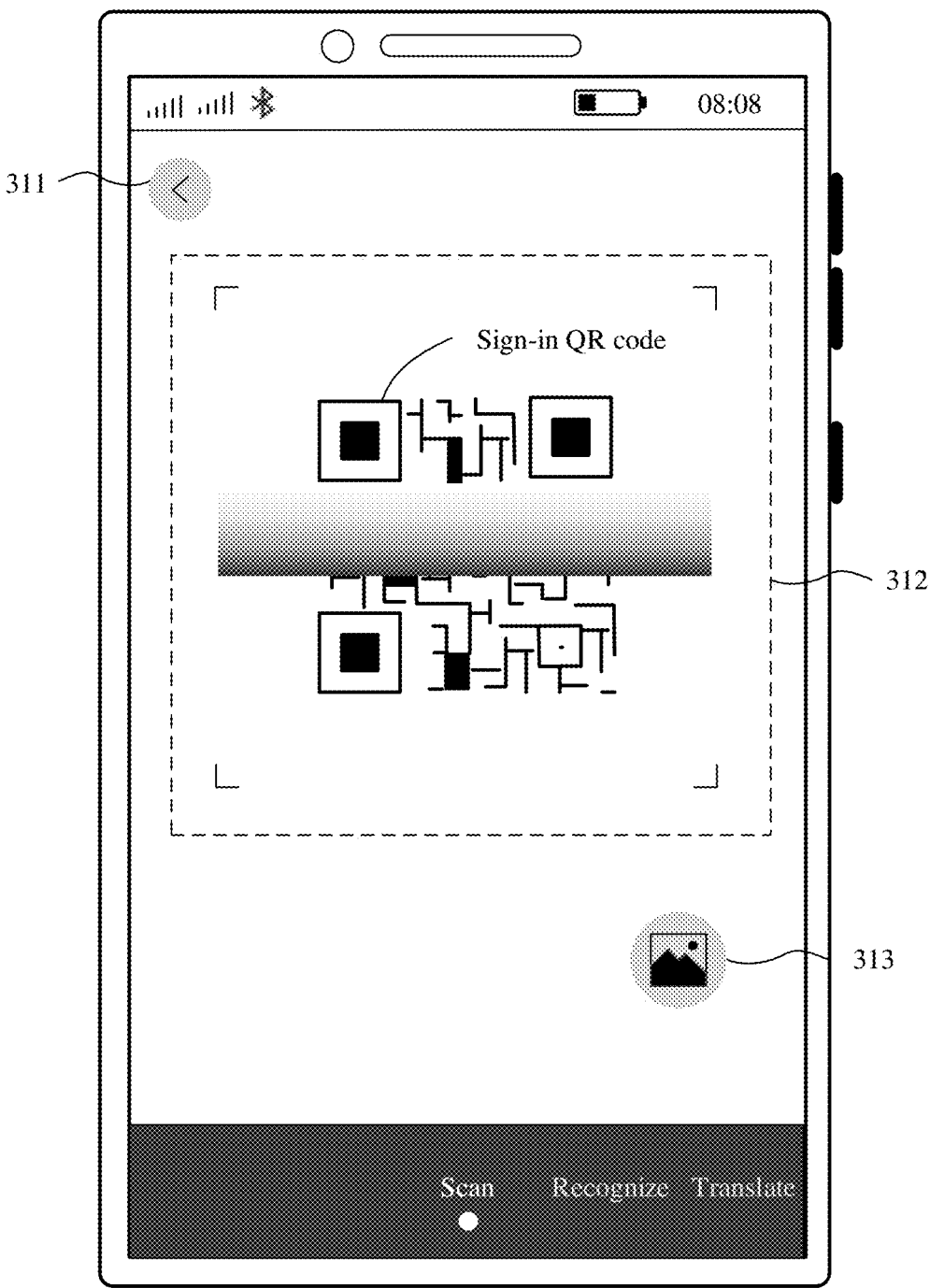

As shown in FIG. 4B, the user interface 31 is the user interface used by the electronic device 100 to scan an image. When the electronic device 100 enters the interface, the electronic device 100 generates an access request for enabling a camera, and displays, in response to the request, an image obtained through the camera in the interface.

The user interface 31 includes a return control 311, a recognition area 312, and a gallery control 313. The return control 311 is used to exit the currently displayed user interface 31 and return to the user interface 21.

The recognition area 312 may be used to indicate an area in which the electronic device 100 recognizes an image. When the image obtained through the camera is located in the recognition area 312, the electronic device 100 may perform a corresponding operation based on information carried in the image.

The gallery control 313 may be used to open a gallery of the electronic device 100. The user may select a picture from the gallery as an object to be recognized by the electronic device 100.

As shown in FIG. 4B, sign-in QR code is detected in the recognition area 312. The sign-in QR code is QR code provided by a management party device for the user to sign in, and the QR code may be pasted at a sign-in desk in a form of a paper picture, or may be displayed through the management party device in a form of an electronic image. The sign-in QR code may include information (for example, an IP address) about the management party device. When recognizing the information included in the sign-in QR code, the electronic device 100 sends a sign-in request to the management party device, then exits the current user interface 31, and displays a user interface 21 shown in FIG. 4C.

Figure 4C:
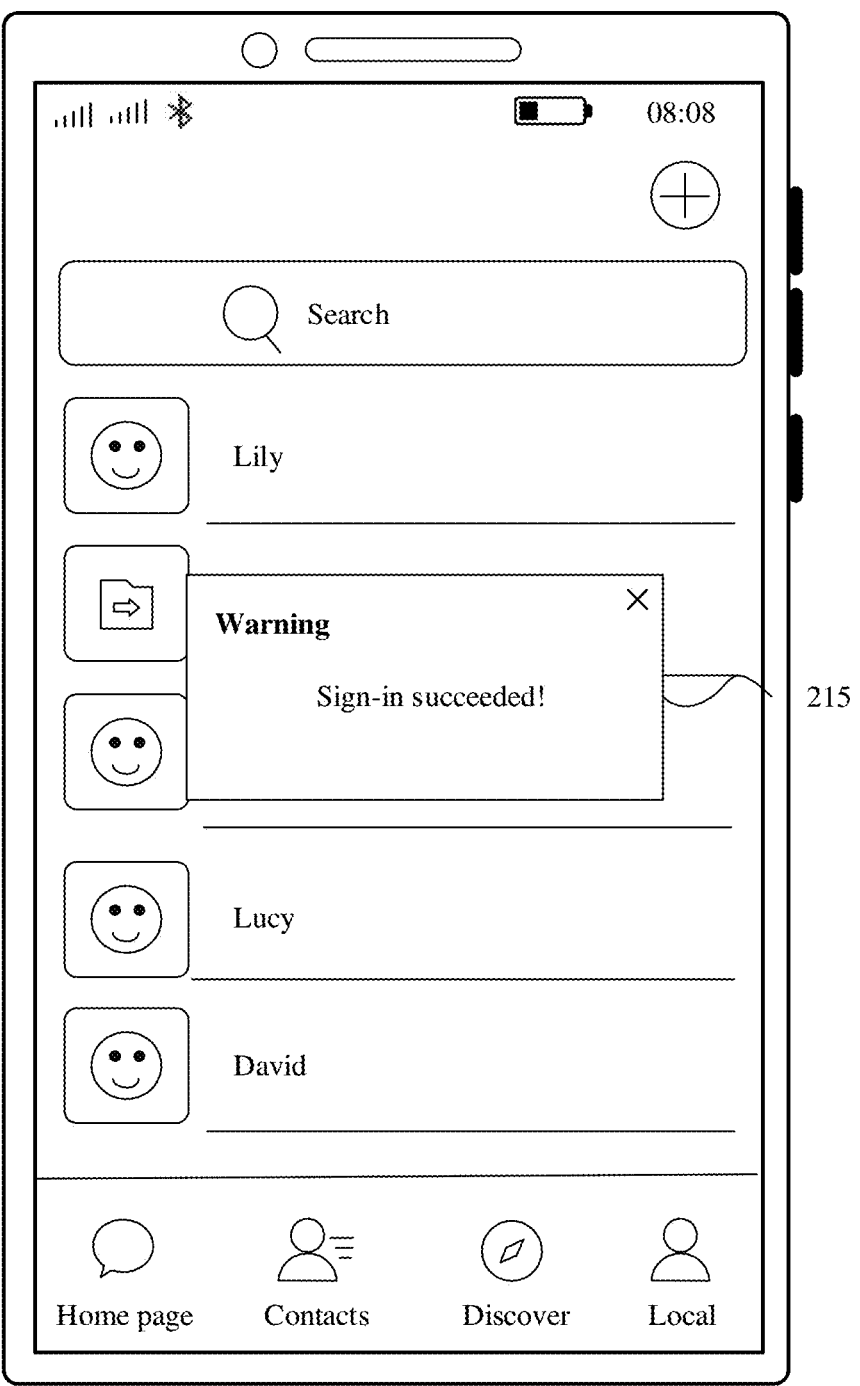

In some embodiments, after sending the sign-in request to the management party device, the electronic device 100 may exit the user interface 31 after receiving sign-in confirmation information fed back by the management party device, and then display the user interface 21 shown in FIG. 4C.

As shown in FIG. 4C, a first prompt box 215 is displayed in the user interface 21. The first prompt box 215 is used to prompt the user that sign-in has been completed currently. The first prompt box 215 may automatically disappear after a period of time (for example, two seconds). After the electronic device 100 completes the sign-in, the management party device sends an access policy to the electronic device 100. The access policy includes forbidding a function of using the camera by the electronic device 100.

In some embodiments, the first prompt box 215 may include a confirmation control. When the electronic device 100 detects an operation of tapping the confirmation control by the user, the first prompt box 215 disappears.

Figure 4D:
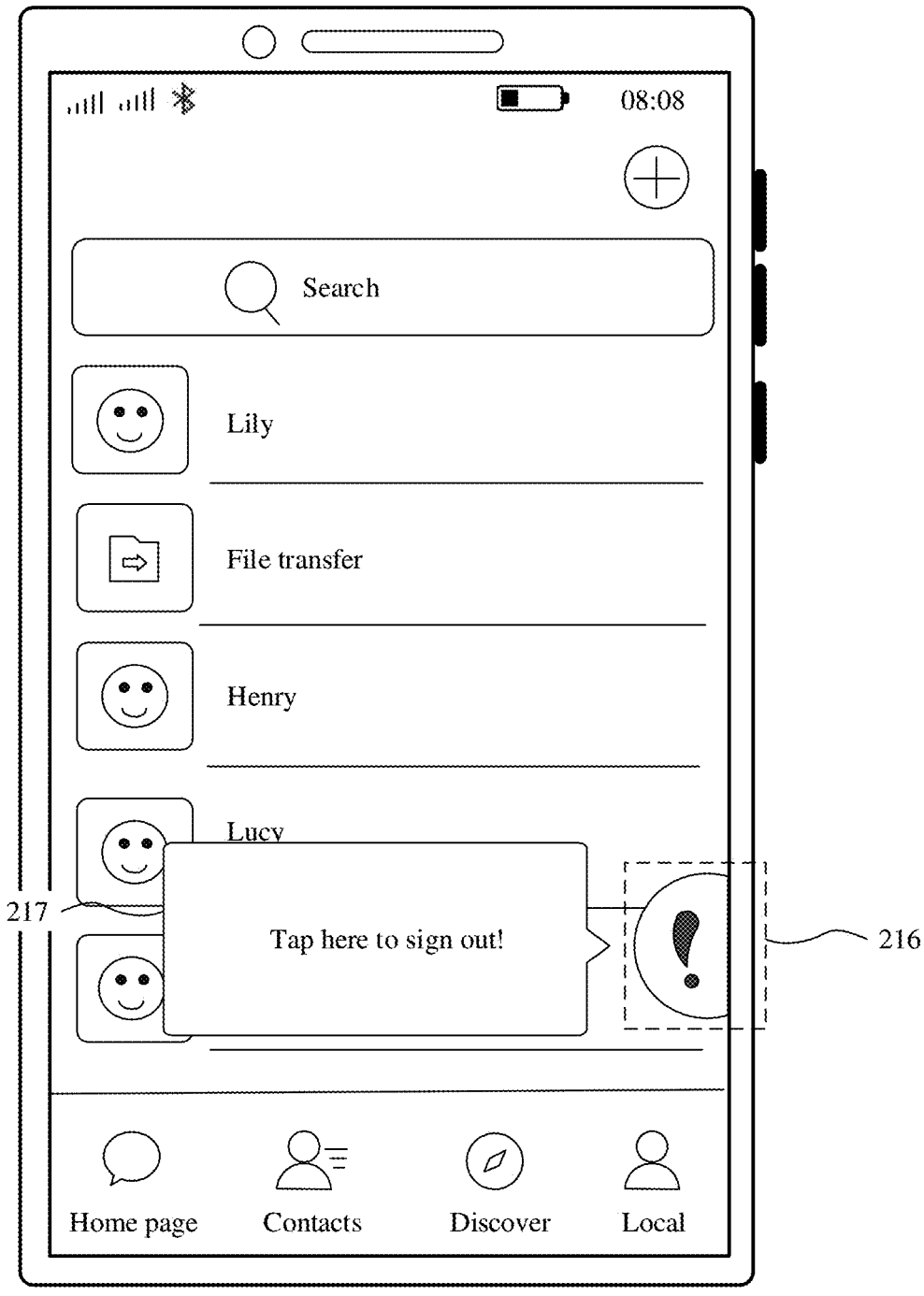

As shown in FIG. 4D, after the first prompt box 215 disappears, a sign-out label 216 may be displayed in the user interface 21. The sign-out label 216 may be used to sign out and remove a restriction of the management party on a function of the electronic device 100. In addition, the sign-out label 216 does not belong to content provided by the social application, and does not disappear or change a location with switching of the user interface. In addition, when the sign-out label 216 just starts to be displayed in the user interface 21, a second prompt box 217 may be further displayed in the user interface 21. The second prompt box 217 is used to prompt the user to tap the sign-out label 216 to perform sign-out. The second prompt box 217 may automatically disappear after a period of time (for example, two seconds).

Figure 4E:
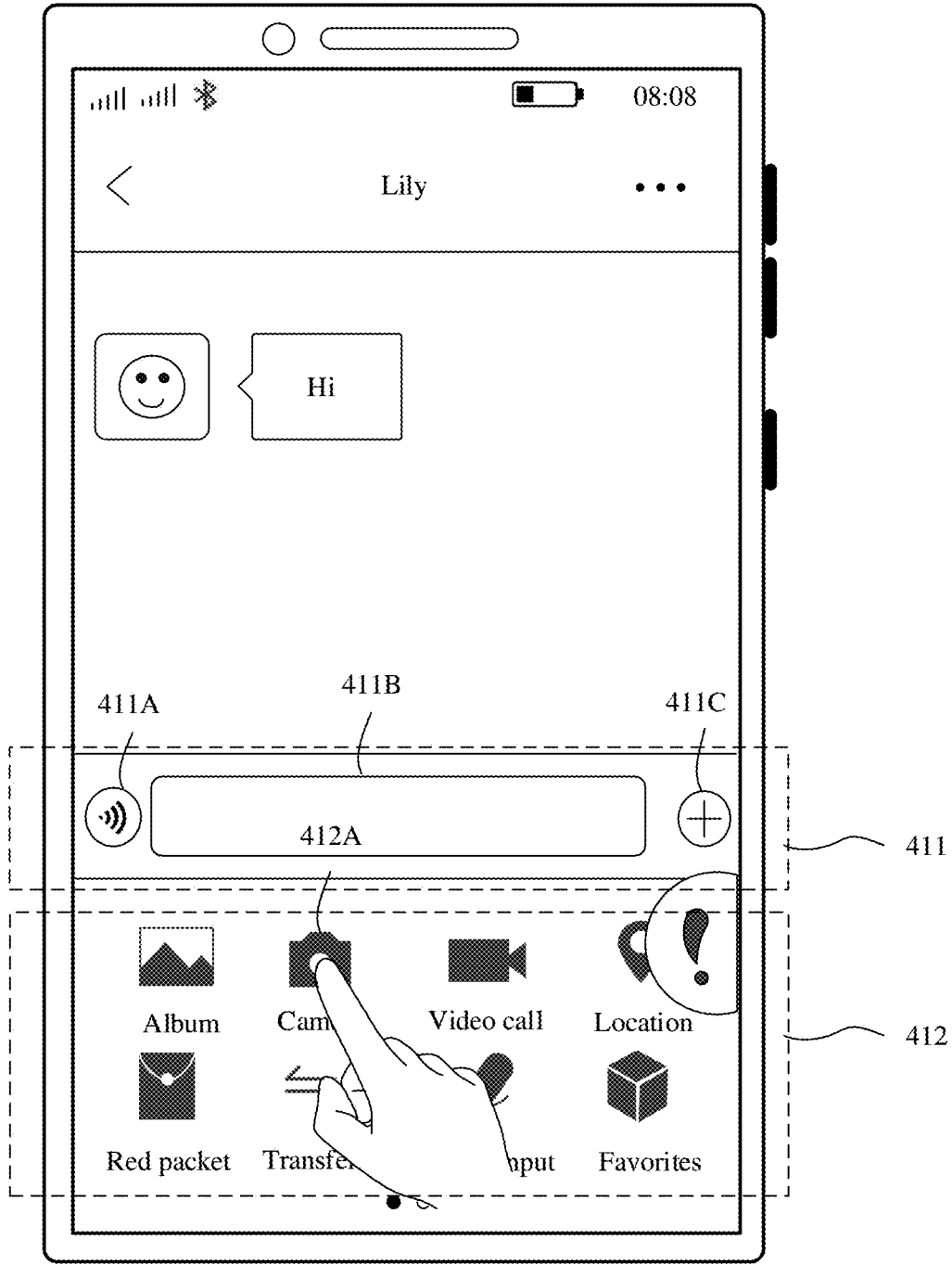

As shown in FIG. 4E, a user interface 41 is a chat interface of the application, and the user may chat online with another social friend in the interface.

The user interface 41 includes a first option box 411 and a second option box 412.

The first option box 411 includes a voice control 411A, a text input box 411B, and a More option 411C. The voice control 411A may be used to monitor a user operation that triggers a voice input. The text input box 411B may be used to monitor a user operation that triggers a text input. The More option 411C may be used to trigger a user operation of switching between the second option box 412 and a keyboard. The second option box 412 may be used to display more chat auxiliary functions such as sending a photo, taking a photo, making a video call, sending positioning information, sending a red packet, transferring, making a voice input, and sharing favorites. The second option box 412 includes a photographing control 412A. The electronic device 100 may detect a user operation (for example, a tap operation) performed on the photographing control 412A, and the electronic device 100 generates, in response to the operation, an access request for enabling the camera function. The electronic device 100 determines, based on the access policy sent by the management party during sign-in, whether to accept or refuse the access request. The access policy obtained through sign-in by the electronic device 100 includes forbidding a function of using the camera by the electronic device 100, that is, the function of using the camera is a restricted function of the electronic device 100. Therefore, when the electronic device 100 executes the access policy, the electronic device 100 refuses the access request, in other words, the electronic device 100 refuses to use the camera.

The electronic device 100 may include but is not limited to the following two manners of executing the access policy:

1. The electronic device 100 directly executes the access policy.

Figure 4F:
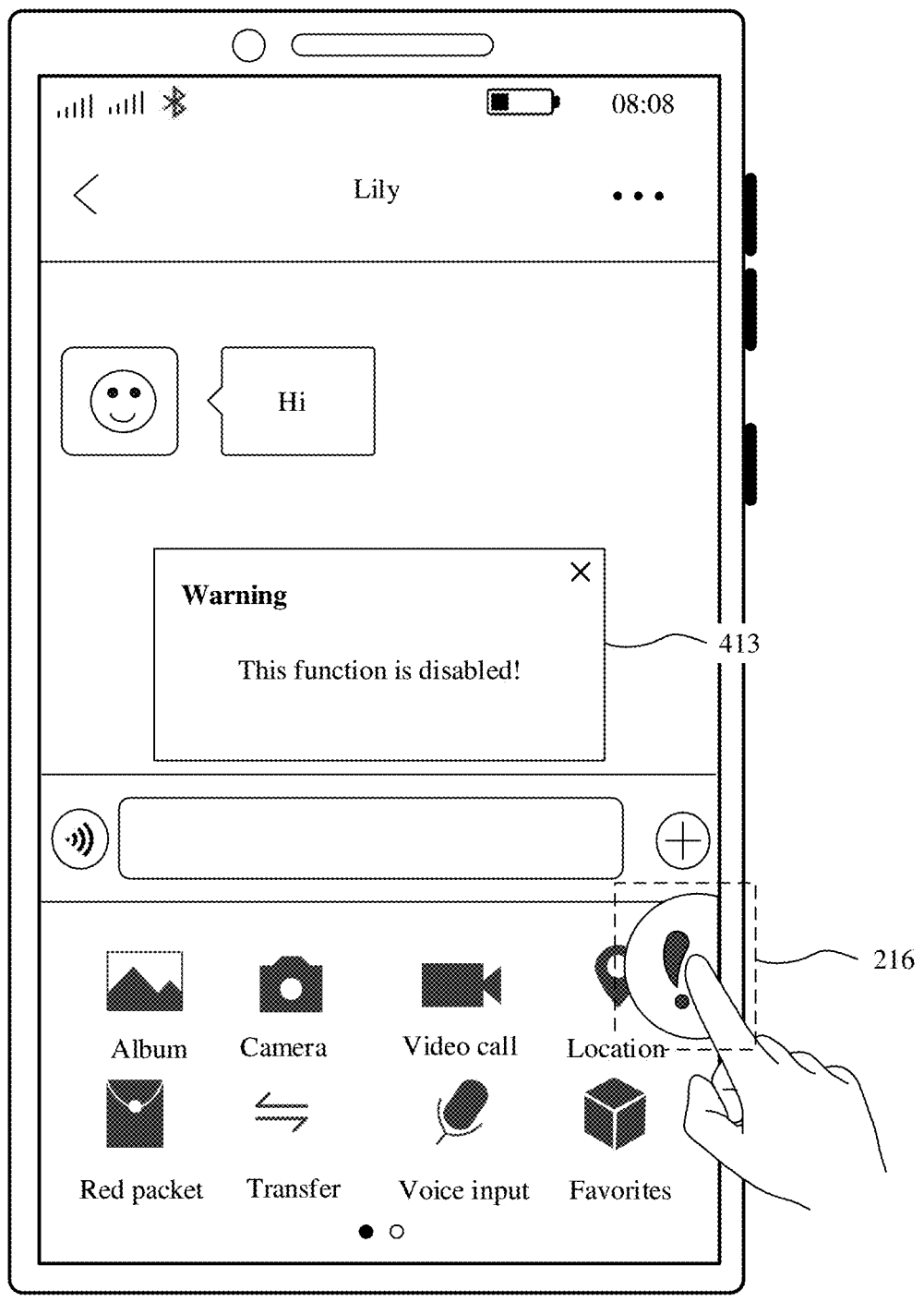

In some embodiments, as shown in FIG. 4F, when the electronic device 100 determines, based on the access policy, to refuse the access request for enabling the camera function, the electronic device 100 refuses the access request, and displays a third prompt box 413. The third prompt box 413 is used to prompt the user that the camera is forbidden to use after sign-in. Consequently, the management party device can forcibly restrict a function of the electronic device 100.

2. The electronic device 100 prompts the user, and executes the access policy after user confirmation.

Figure 4G:
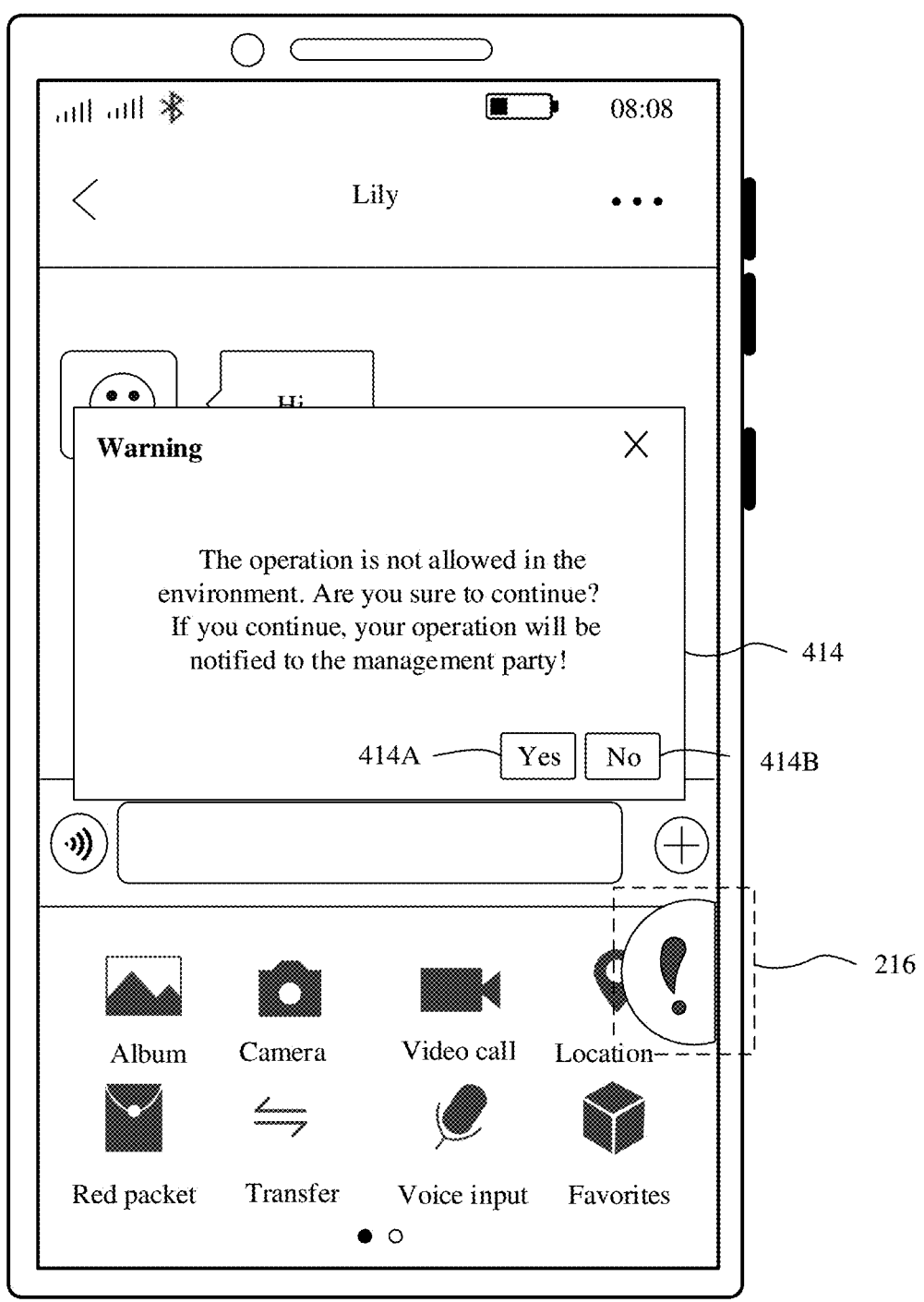

In some other embodiments, as shown in FIG. 4G, when the electronic device 100 determines, based on the access policy, that the access request for enabling the camera function needs to be refused, a fourth prompt box 414 is displayed in the electronic device 100. The fourth prompt box 414 is used to prompt the user whether to continue to perform the operation (the user operation performed on the photographing control 412A). The fourth prompt box 414 includes a Yes control 414A and a No control 414B. The Yes control 414A is used to monitor and trigger continued execution of the operation (the user operation performed on the photographing control 412A). When the electronic device 100 detects a user operation performed on the Yes control 414A, the electronic device 100 refuses, in response to the operation, to execute the access policy and accepts the access request for enabling the camera function. In addition, the electronic device 100 may send, to the management party device, an execution status of refusing to execute the access policy. When the electronic device 100 detects a user operation performed on the No control 414B, the electronic device 100 accepts, in response to the operation, execution of the access policy and refuses the access request for enabling the camera function.

Figure 4H:
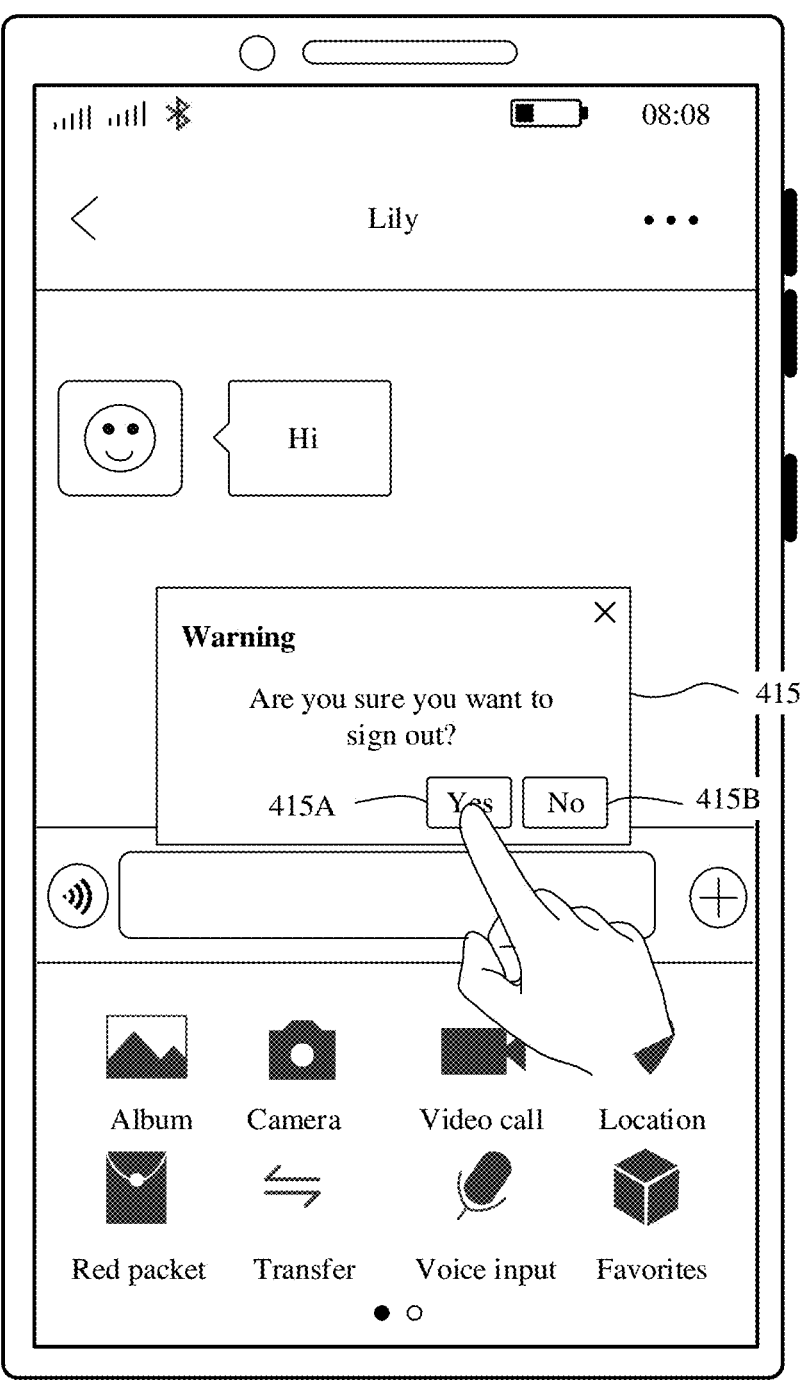

Then, the electronic device 100 may detect a user operation (for example, a tap operation) performed on the sign-out label 216, and in response to the operation, the sign-out label 216 is updated to a fifth prompt box 415 shown in FIG. 4H.

As shown in FIG. 4H, the fifth prompt box 415 is displayed in the user interface 41, and the fifth prompt box 415 is used to prompt the user whether to sign out. The fifth prompt box 415 includes a Yes control 415A and a No control 415B. The Yes control 415A is used to monitor a user operation that triggers sign-out. When the electronic device 100 detects the user operation performed on the Yes control 415A, the electronic device 100 sends a sign-out request to the management party device in response to the operation, where the sign-out request may include an identifier of the electronic device 100. The electronic device 100 may receive sign-out feedback information fed back by the management party device, and the electronic device 100 deletes or disables an access policy obtained through current sign-in. The fifth prompt box 415 is updated to a sixth prompt box 416 shown in FIG. 4I, where the sixth prompt box 416 is used to prompt successful sign-out of the electronic device 100, and an access request generated on the electronic device 100 later is not affected by the access policy. The No control 415B is used to monitor a user operation that triggers cancellation of sign-out. When the electronic device 100 detects the user operation performed on the No control 415B, the access policy obtained through sign-in by the electronic device 100 is still valid, and a function of the electronic device 100 is still restricted by the access policy.

In this embodiment of this application, sign-in and sign-out manners are not limited to the manner of manually completing sign-in and sign-out by scanning QR code in FIG. 4A to FIG. 4I, and there may be other sign-in and sign-out manners, for example, automatic sign-in and automatic sign-out.

Figure 5A:
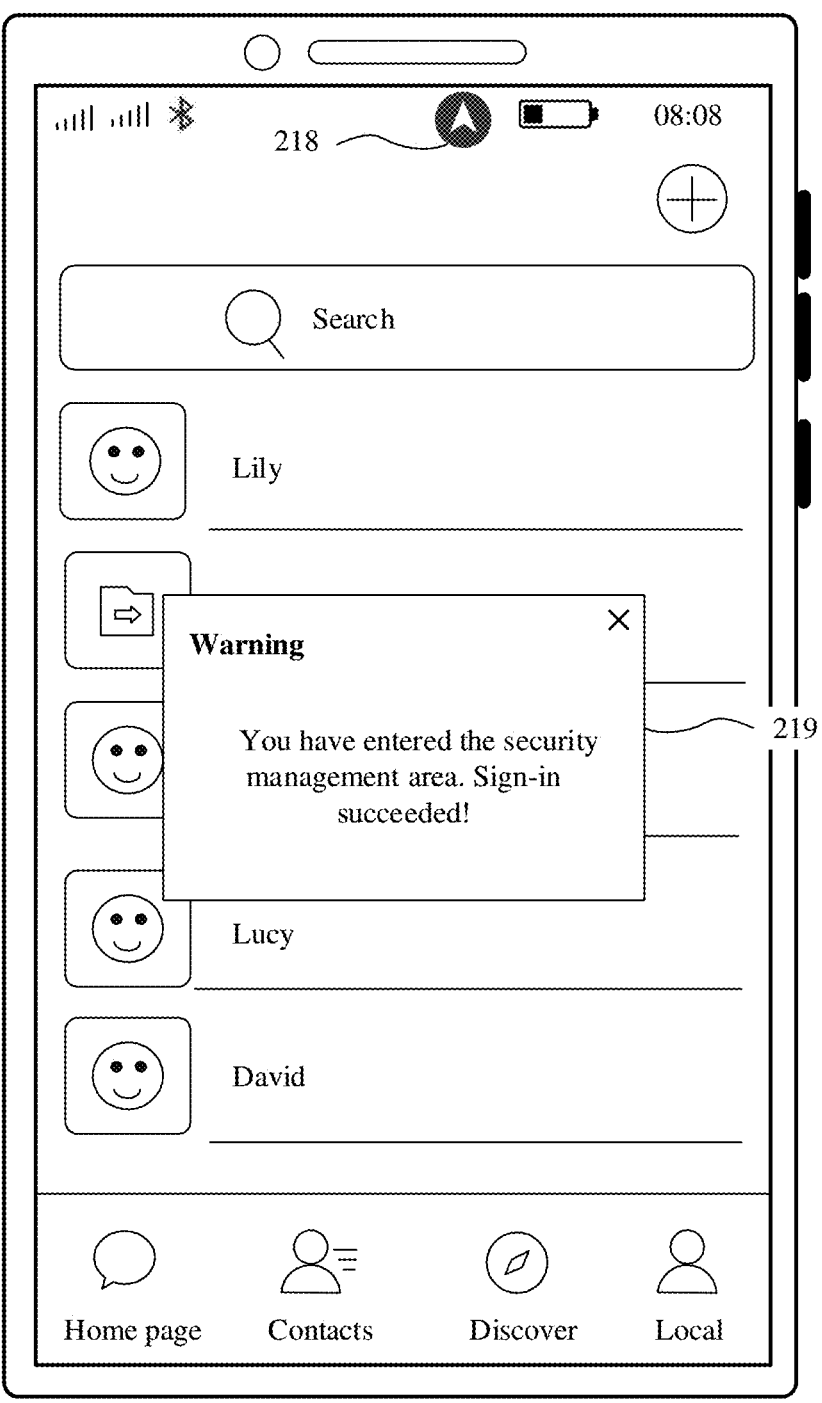
FIG. 5A and FIG. 5B show another group of user interfaces according to an embodiment of this application.
Figure 5B:

Referring to FIG. 5A and FIG. 5B, in a user interface 21 shown in FIG. 5A, the user interface 21 includes a positioning icon 218, where the positioning icon 218 is used to indicate that the user has enabled a GPS positioning function currently. When the electronic device 100 enters a specific environment managed and monitored by the management party device, the electronic device 100 automatically completes sign-in, and a seventh prompt box 219 is displayed in the user interface 21. The seventh prompt box 219 is used to prompt the user that the sign-in has been completed. When the electronic device 100 leaves the specific environment managed and monitored by the management party device, the electronic device 100 automatically signs out, and an eighth prompt box 417 is displayed in the user interface 41 shown in FIG. 5B. The eighth prompt box 417 is used to prompt the user that the sign-out has been completed.

In some embodiments, there may be a plurality of combinations for sign-in and sign-out manners of the electronic device 100: 1. manual sign-in and automatic sign-out; 2. automatic sign-in and manual sign-out; 3. automatic sign-in and automatic sign-out; and 4. manual sign-in and manual sign-out. This is not limited in this application.

The following describes, with reference to FIG. 6A to FIG. 6F, examples of a group of user interfaces implemented on the electronic device 200.

FIG. 6A to FIG. 6F show examples of user interfaces used by the electronic device 200 to monitor and manage an electronic device in a specific environment to execute an access policy. For example, an electronic device 100 is the electronic device that enters the specific environment managed and monitored by the electronic device 200.

Figure 6A:
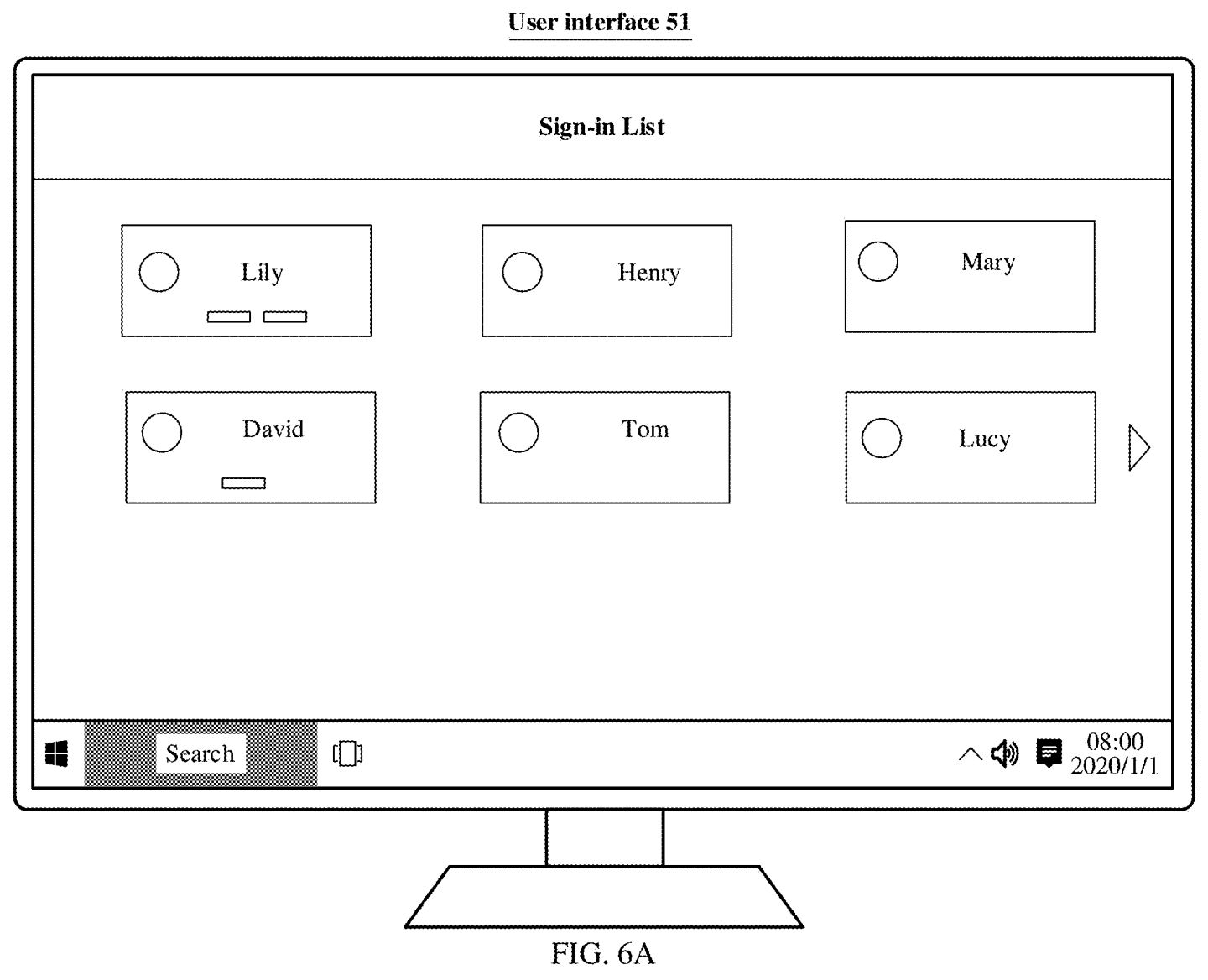

As shown in FIG. 6A, a user interface 51 is an example interface used by the electronic device 200 to display a sign-in list. After an electronic device (for example, the electronic device 100) completes sign-in, information (for example, name information and an execution status of executing the access policy) about the electronic device may be added to the user interface 51. After the electronic device completes sign-out, the information about the electronic device may be deleted from the user interface 51. In this way, the management party may learn in detail sign-in and sign-out statuses of the electronic device in the specific environment by using the user interface 51.

Figure 6B:
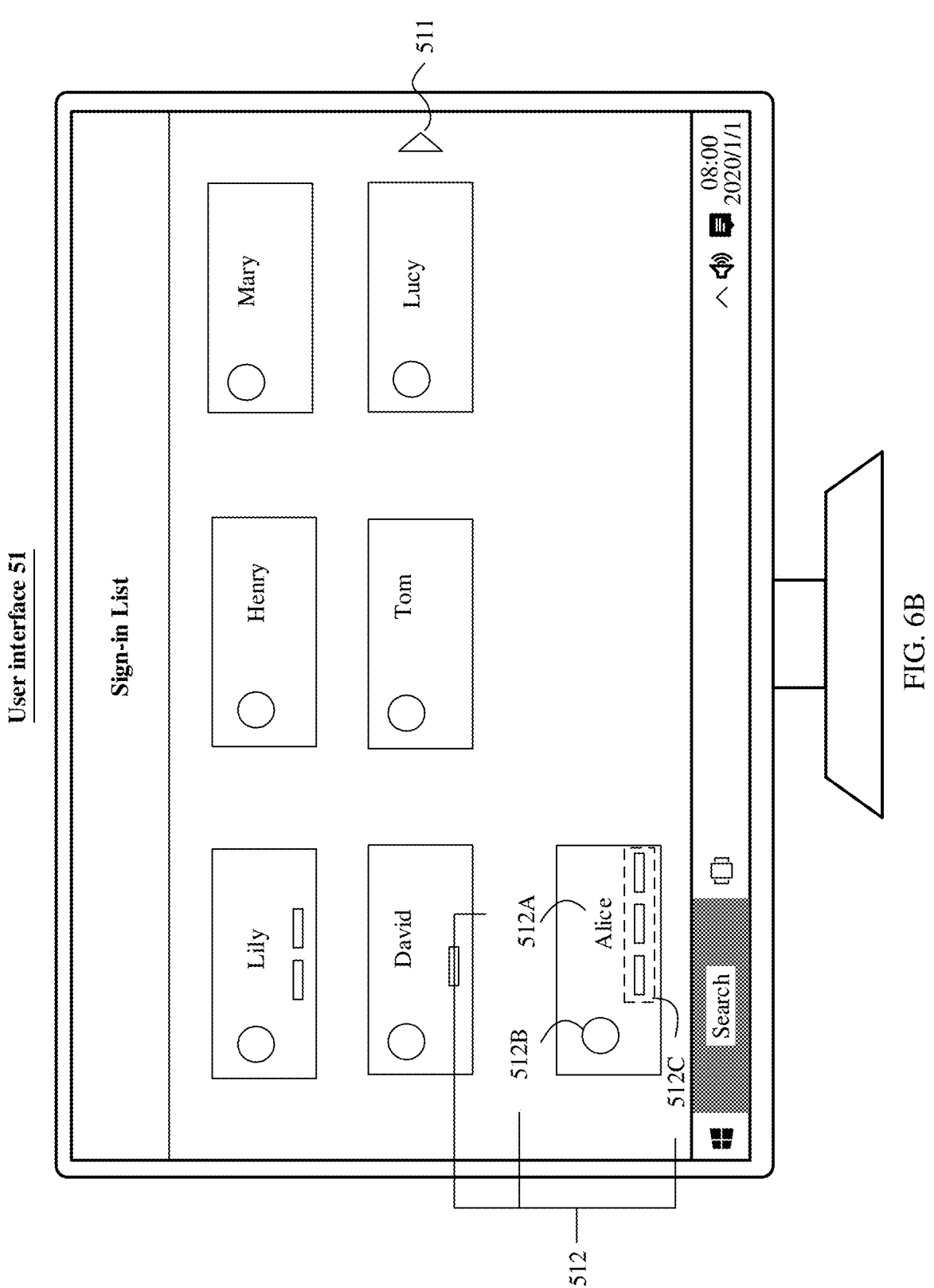

As shown in FIG. 6B, after the electronic device 100 completes a sign-in request, a sign-in user 512 is newly added to the user interface 51. The sign-in user 512 is used to display an electronic device that completes sign-in, and the sign-in user 512 may include a user name 512A and an execution status icon 512B. The user name 512A may be used to indicate an identifier of the electronic device 100 that completes sign-in, for example, a name used when the user logs in to an account. The execution status icon 512B is used to indicate an execution status of executing the access policy by the electronic device 100, and the execution status icon 512B may have different colors for indicating different execution states. For example, when the electronic device 100 executes the access policy, the execution status icon 512B may be white; or when the electronic device 100 refuses to execute the access policy, the execution status icon 512B may be black.

Further, when the electronic device 100 sends sign-in information to the electronic device 200 for sign-in, the sign-in information may further carry information about an electronic device associated with the electronic device 100, that is, information about an associated device, and the electronic device 200 may further display the information about the associated device in the sign-in list. The electronic device associated with the electronic device may be an electronic device that establishes a Bluetooth connection or a network connection to the electronic device 100, or that logs in to a same account as the electronic device 100.

In this case, the sign-in user 512 may further include an associated device icon 512C. The associated device icon 512C is used to indicate an execution status of executing the access policy by the associated device. The associated device icon 512C may include a plurality of small icons, and each icon uniquely indicates one associated device. Similar to the execution status icon 512B, the associated device icon 512C may have different colors for indicating different execution states. For details, refer to related descriptions of the execution status icon 512B.

It may be understood that the electronic device 100 is any electronic device that enters a specific environment. After different electronic devices successfully sign in, a uniquely determined sign-in user 512 corresponding to the electronic device can be found in the sign-in list. The management party may view, by using the sign-in user 512 corresponding to the electronic device, a user name, and execution statuses of executing the access policy by the electronic device and the electronic device associated with the electronic device.

In some embodiments, the identifier indicated by the user name 512A may alternatively be a name, a model number, a serial number, an IMEI number of the electronic device 100, or another identifier that can indicate the electronic device. Alternatively, the user name 512A may be a name (for example, a sign-in sequence number) determined by the electronic device 200 when the electronic device boo signs in. The electronic device 200 may return the name to the electronic device that completes sign-in, and the user may determine, based on the name, an identifier of an electronic device carried by the user in the specific environment. An identifier of the electronic device is not limited in this embodiment of this application.

In some embodiments, the sign-in user 512 may be added to the user interface 51 after the electronic device 200 receives a sign-in request of the electronic device 100. In this case, the user interface 51 may further include a control for pushing an access policy, where the control may be used to trigger unified sending of the access policy to electronic devices in the sign-in list. A color of the execution status icon 512B presented before the electronic device 200 sends the access policy may be different from a color (for example, gray) presented when the electronic device executes or refuses to execute the access policy. In this way, the management party may self-determine, based on sign-in statuses (for example, a quantity of electronic devices that complete sign-in) of the electronic devices in the user interface 51, time for sending the access policy.

Further, before the electronic device 200 triggers unified sending of the access policy, the management party may select access policies sent to electronic devices that complete sign-in, and different access policies may be selected for different electronic devices.

In some other embodiments, access policy configuration may alternatively be newly added to the user interface 51 of the electronic device 200 before the electronic device 200 receives a sign-in request of the electronic device 100 and sends the access policy to the electronic device 100. In this way, the management party does not need to manually send the access policy, and the management party device may automatically select and send the access policy after receiving the sign-in request, so that operations of the management party are simplified, and the management party can manage and monitor the user more efficiently and conveniently.

In addition, after the electronic device 200 sends the access policies to the electronic devices that complete sign-in, a default color of the execution status icon 512B may be a color when the access policies are executed. The electronic device 200 may receive an execution status of refusing to execute the access policy by the electronic device, and the color of the execution status icon 512B turns to black. The electronic device 200 may further receive an execution status of refusing to execute the access policy by the electronic device associated with the electronic device, the color of the execution status icon 512B turns to black, and small icons corresponding to the associated device 512C turns to black. For details, refer to changes of the electronic devices that complete sign-in in FIG. 6B and FIG. 6C.

As shown in FIG. 6B, the user interface 51 may further include a More option 511. When the electronic device 200 detects an operation performed on the More option 511 shown in FIG. 6B, the electronic device 200 displays a more operation menu 513 shown in FIG. 6C.

Figure 6C:
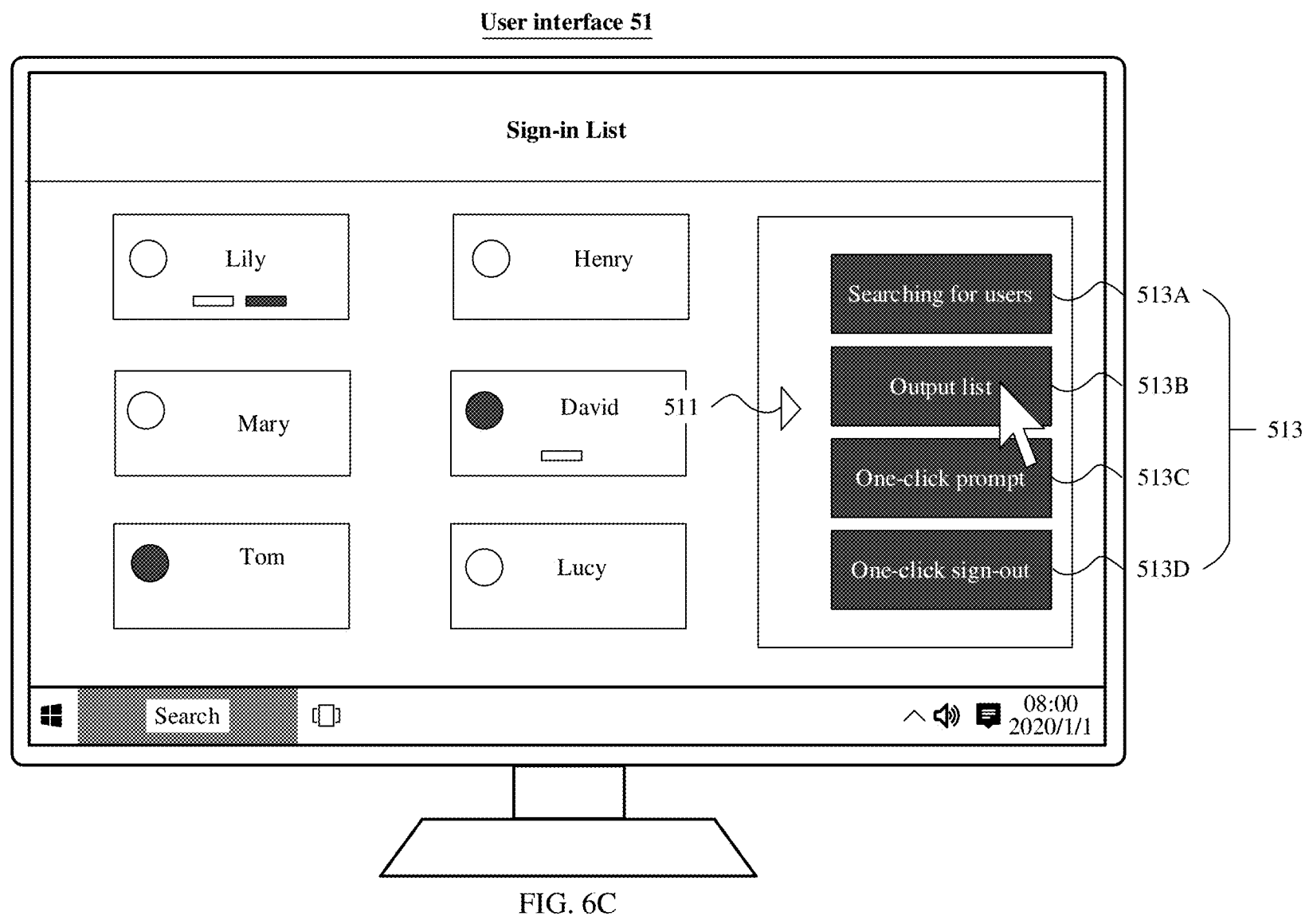

As shown in FIG. 6C, the more operation menu 513 includes a user search control 513A, a list output control 513B, a one-click prompt control 513C, and a one-click sign-out control 513D.

The user search control 513A may be used to search the sign-in list for a specific electronic device.

The list output control 513B may be used to select, from the sign-in list, electronic devices that refuse to execute the access policy. When the electronic device 200 detects an operation (for example, a tap operation) performed on the list output control 513B, the electronic device 200 displays a user interface shown in FIG. 6D.

The one-click prompt control 513C may be used to trigger sending of prompt information to the electronic devices that refuse to execute the access policy and that is in the sign-in list, to prompt the electronic device to execute the access policy.

The one-click sign-out control 513D may be used to trigger sending of sign-out feedback information to all electronic devices in the sign-in list, and the electronic devices may complete sign-out after receiving the sign-out feedback information.

Figure 6D:
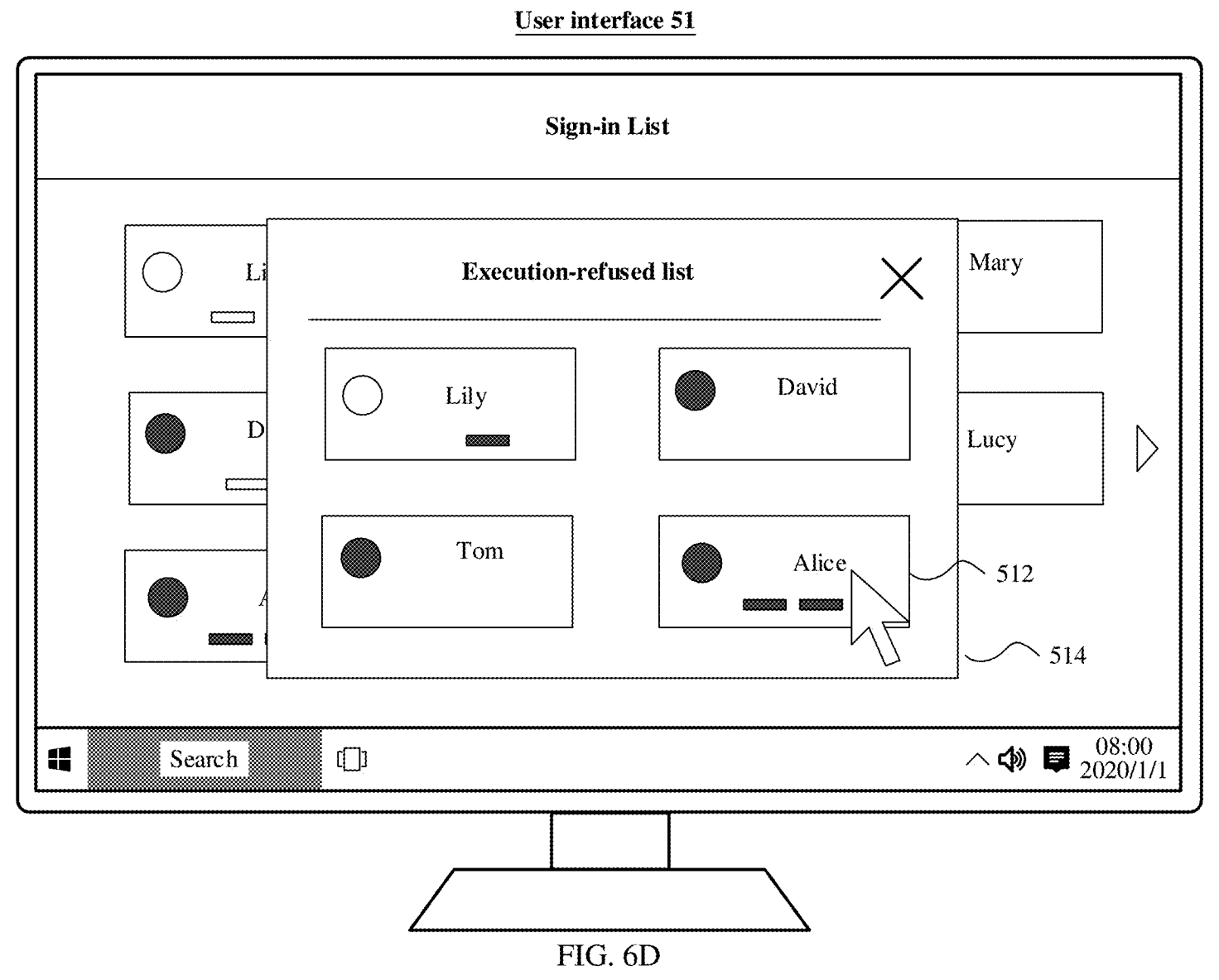

As shown in FIG. 6D, an execution-refused list 514 is displayed in the user interface 51, and the execution-refused list 514 is used to display information about the electronic devices that refuse to execute the access policy. In this way, the management party may make, by viewing information about the electronic devices in the interface, an oral warning to a user corresponding to the electronic device that refuses to execute the access policy. Then, the electronic device 200 may detect an operation (for example, a tap operation) performed on the sign-in user 512, and the electronic device 200 displays, in response to the operation, a user interface 61 shown in FIG. 6E.

Figure 6E:
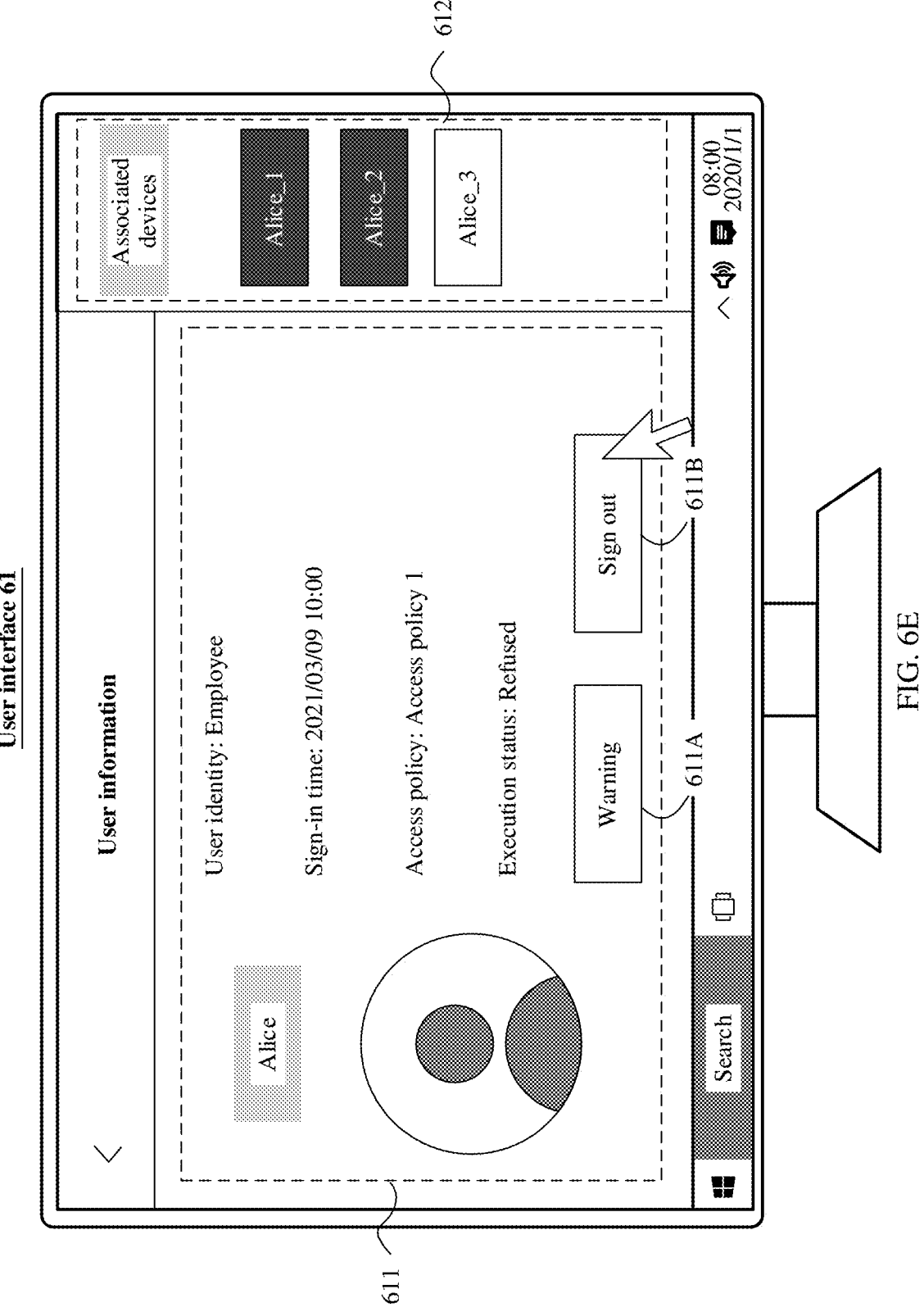

As shown in FIG. 6E, the user interface 61 is used to display related information of a specific electronic device. The user interface 61 includes user information 611 and associated device information 612. The user information 611 may include a user identity, sign-in time, an access policy, and an execution status of the electronic device. The associated device information 612 may indicate execution statuses of electronic devices associated with the electronic device. The user identity may be identity information (for example, a student, a teacher, an employee, or a guest) of a login account of the electronic device. The sign-in time is a time point at which the electronic device 200 receives a sign-in request sent by the electronic device. The access policy is an access policy sent by the electronic device 200 to the electronic device. The execution status is an execution status (for example, an executed state or an execution-refused state) of executing the access policy by the electronic device. As shown in FIG. 6E, some associated devices with a same user name may complete sign-in but some may not complete sign-in. In the interface in FIG. 6E, the management party may conveniently learn, in the electronic device 200, execution statuses of devices with different user names. Further, the electronic device may send prompt information to devices that do not complete sign-in, or send prompt information to devices that complete sign-in and that belongs to a same user name, to prompt the associated devices to sign in.

In addition, the user information 611 may further include a prompt control 611A and a sign-out control 611B. The prompt control 611A may be used to trigger sending of prompt information to the electronic device, and prompt the electronic device to execute the access policy. The sign-out control 611B may be used to trigger sending of sign-out feedback information to the electronic device, and the electronic device may complete sign-out after receiving the sign-out feedback information. When the electronic device 200 detects an operation (for example, a tap operation) performed on the sign-out control 611B, the electronic device 200 displays, in response to the operation, a user interface 51 shown in FIG. 6F, and deletes, from the user interface 51, the sign-in user 512 corresponding to the electronic device 100.

In some embodiments, the electronic device 200 may further detect an operation (for example, a tap operation) performed on any associated device displayed in the associated device information 612 shown in FIG. 6E, and the electronic device 200 switches, in response to the operation, related information in the user interface 61 to related information about the associated device.

It may be understood that related information of the electronic device may include more or less information, and is not limited to the information displayed in the user interface 61. This is not limited in this embodiment of this application.

It may be learned that, according to the access control method provided in this embodiment of this application, functions of an electronic device that enters a specific environment can be managed and monitored through sign-in, to simplify a process of configuring an access policy by the user, and enhance a management and monitoring effect of the management party on an electronic device carried by the user.

In the processes shown in FIG. 4A to FIG. 4I, FIG. 5A and FIG. 5B, and FIG. 6A to FIG. 6F, the electronic device 100 may perform the access control method provided in this embodiment of this application. The following describes in detail an implementation procedure of the access control method with reference to examples in FIG. 4A to FIG. 4I, and FIG. 5A and FIG. 5B.

Figure 7:
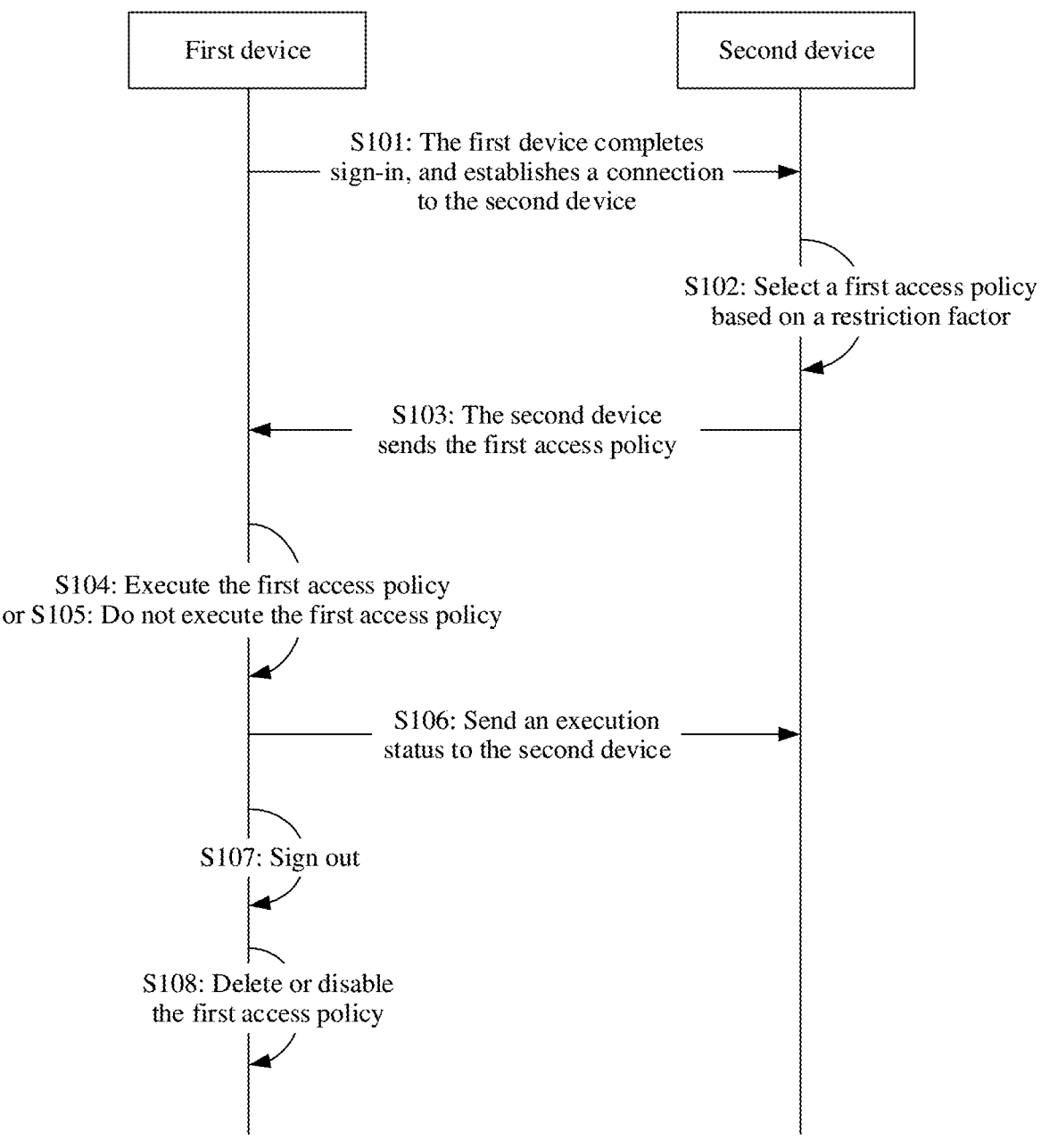
FIG. 7 is an overall schematic flowchart of an access control method according to an embodiment of this application.

The following describes, with reference to FIG. 7, in detail an overall procedure of the access control method in this embodiment of this application.

As shown in FIG. 7, the method includes the following steps.

Phase 1: Obtain an Access Policy

S101: A first device completes sign-in, and establishes a connection to a second device.

The first device and the second device respectively represent a device of a user and a device of a management party.

The first device is an electronic device carried or used by the user. The first device may be a device such as a mobile phone, a tablet, a computer, or a band, for example, the electronic devices 1002 to 1006 shown in FIG. 1. The second device is a device used by the management party to restrict functions of an electronic device in a specific environment. The second device may be an electronic device such as a server, a computer, a mobile phone, or a tablet, for example, the electronic device 1001 shown in FIG. 1.

The specific environment is a place or an area that is managed and monitored by the second device and that restricts functions of the first device. The restrictions on the functions of the electronic device are access restrictions on a resource, data, a capability, and the like of the electronic device. For example, the restrictions may be restrictions on an application such as photographing, video recording, voice recording, music, and a game in the electronic device, or may be restrictions on a network access status, a power-on/off status, a call status, and the like of the electronic device.

Sign-in means that the first device sends a first request to the second device, and the second device learns, based on the first request, that the first device has entered the specific environment managed and monitored by the second device. The first request carries an identifier of the first device.

The sign-in may include but is not limited to the following two manners: manual sign-in and automatic sign-in.

1. Manual sign-in means that the first device may obtain related information (for example, an IP address) of the second device by using a sign-in application, verification information, or the like, and actively send the first request to the second device, to complete sign-in. The verification information may mean that the second device first outputs related information (for example, QR code or sign-in verification code) used for sign-in, and the first device actively obtains the related information to initiate a sign-in operation.

For details about the manual sign-in manner, refer to user interfaces shown in FIG. 4A to FIG. 4C and related descriptions thereof.

2. Automatic sign-in means that the first device may automatically complete sign-in in a positioning manner such as a GPS, Bluetooth, or a Wi-Fi hotspot. The first request may be implemented as a Bluetooth connection request, a network connection request, or the like. When the second device receives the first request, it indicates that the first device enters an acceptable range of a signal of the second device. In this case, the first device may be determined as entering the specific environment managed and monitored by the second device. The first request may alternatively be any other request that carries location information. In this case, when the second device sets a range of the specific environment in advance, the second device may determine, by using the location information, whether the first device enters the range of the specific environment managed and monitored by the second device, to automatically complete sign-in.

For details about the automatic sign-in manner, refer to the user interface shown in FIG. 5A and related descriptions thereof.

In some embodiments, the second device may update and maintain a sign-in list. After the second device receives the first request sent by the first device, the second device may add information (for example, an identifier) about the first device to the sign-in list. In this way, the second device may determine a quantity of electronic devices that enter the specific environment, to better manage and monitor the electronic devices that enter the specific environment.

For a sequence in which the first device completes sign-in and establishes a connection to the second device, there may be the following three cases:

1. The first device may first complete sign-in, and then establish a connection to the second device.

In this way, the second device may first obtain, through sign-in, information about the first device that enters a specific area, and more quickly establish a connection between the first device and the second device.

2. The first device may first establish a connection to the second device, and then complete sign-in.

In this way, the second device can better manage and monitor electronic devices that enter the specific environment, and learn of sign-in statuses and non-sign-in statuses of the electronic devices in the specific environment.

3. The first device may establish a connection to the second device while completing sign-in.

In this way, a process in which the second device manages and monitors the first device can be accelerated, and an effect of managing and monitoring the first device by the second device can be improved.

The case 1 and the case 2 are applicable to the manual sign-in manner, that is, manual sign-in may occur before or after the first device establishes a connection to the second device. The case 2 is applicable to the automatic sign-in manner, that is, when the first device initiates a connection request to the second device, the first device initiates a sign-in request. In this case, sign-in and connection establishment may be performed at the same time.

For details about a change of the user interface of the second device after the first device completes sign-in, refer to the user interface shown in FIG. 6A and FIG. 6B and related descriptions thereof.

S102: The second device selects a first access policy based on a restriction factor.

The access policy is a policy configured by the second device for a specific environment, and the policy may restrict a function of an electronic device (for example, the first device) that enters the specific environment.

In some embodiments, the management party may preset a restriction factor for the specific environment, and configure, in the second device based on the restriction factor, an access policy applicable to the specific environment.

The restriction factor for the specific environment includes but is not limited to one or more of the following:

1. Restriction Range

The management party may preset a range of the specific environment, and the function of the first device is restricted only when the first device enters the range of the specific environment. In addition, the management party may set different access requirements in different ranges.

In this case, the second device may set access policies respectively corresponding to a plurality of areas such as a first range and a second range in the specific environment.

2. Restriction Category

The management party may preset content that needs to be restricted for the electronic device that enters the specific environment. The restriction content may be classified into restriction categories such as a restriction on an application, a restriction on a network, and a restriction on a resource. The restriction category on an application may further be classified into restriction categories such as restrictions on a social application, an entertainment application, and a shopping application.

In this case, the second device may set access policies respectively corresponding to a plurality of restriction categories such as first content and second content for functions of electronic devices in the specific environment.

3. Restriction Level

The management party may classify the specific environment into different restriction levels based on restriction strength, and set access requirements with different strength for different restriction levels. A higher level indicates a stronger restriction on electronic devices that enter the specific environment. For example, an access policy in level 1 indicates that the user is not allowed to take a photo, an access policy in level 2 indicates that the user is not allowed to take a photo or record a video, and an access policy in level 3 indicates that the user is not allowed to take a photo, record a video, or record a voice.

In this case, the second device may set access policies respectively corresponding to a plurality of restriction levels such as a first level and a second level in the specific environment.

4. Restriction Target

The management party can divide different restricted groups based on a restriction target, and different restricted groups have different access requirements. The restriction target may be a type of an electronic device. For example, for a mobile phone and a computer, the management party may set the mobile phone to be forbidden to access a network, and the computer to be forbidden to play a video. The restriction target may alternatively be a login identity of a login user of an electronic device. For example, for a teacher and a student in a classroom, the management party may set the teacher to be forbidden to use a communication application, and the student to be forbidden to use a game application and an entertainment application.

In this case, the second electronic device may set access policies respectively corresponding to a plurality of device types such as a first target and a second target or a plurality of login users in the specific environment.

5. Restriction Time

The management party may set different access requirements for different time periods. When time changes, a restriction on the electronic devices in the specific environment also changes.

In this case, the second device may set access policies respectively corresponding to a plurality of time periods such as a first time period and a second time period in the specific environment.

That is, the second device may include a plurality of access policies, and the plurality of access policies may include one or more of the following: access policies corresponding to different specific environments, access policies respectively corresponding to a plurality of areas in a same specific environment, access policies respectively corresponding to a plurality of time periods in a same specific environment, access policies respectively corresponding to a plurality of restriction levels in a same specific environment, access policies respectively corresponding to a plurality of restriction targets in a same specific environment, access policies respectively corresponding to a plurality of restriction categories in a same specific environment, and the like.

It can be seen that, when selecting an access policy based on the restriction range, the restriction target, or the restriction time, the second device may respectively select corresponding access policies based on an area in which the electronic device is currently located in the specific environment, a device type of an electronic device, or a login identity of a login user, and a time point at which the electronic device sends the first request. When selecting access policies based on the restriction content and the restriction level, the second device may self-determine a restriction category for a function of an electronic device in the specific environment and a restriction level for the specific environment, to select corresponding access policies.

The second device may select corresponding access policies based on the foregoing different restriction factors and send the access policies to the first device. In this way, for electronic devices that enters the specific environment, different electronic device carriers may comply with different access requirements, and restrictions on functions of the electronic devices can be more accurate and diversified.

It may be understood that restriction factors for the specific environment are not limited to the content listed above. The management party may set an access policy for the specific environment based on the foregoing one restriction factor or any combination of the plurality of restriction factors, or may select an access policy based on the foregoing one restriction factor or any combination of the plurality of restriction factors. This is not limited in this embodiment of this application.

In a specific example, the second device may configure a first access policy based on the restriction time and the restriction range. The first access policy may include two parts: a policy constraint and a policy context. The policy constraint includes a subject, an object, and a constraint action. The subject is an application in a device, the object is a protected resource, and the constraint action is a constraint action that the subject requests to access the object, where the constraint action may include two types: refuse and accept. The first device may obtain, by using the policy constraint in the access policy, a specific restriction of the management party on an electronic device in the specific environment. For example, when a subject of a policy constraint is a photographing application, an object is a camera, and a constraint action is "refuse", it indicates that using the camera for photographing is refused in the specific environment; on the contrary, when the constraint action is "accept", it indicates that using the camera for photographing is allowed in the specific environment. The policy context includes a location and time. The location is a range of the specific environment. The time includes start time and end time, and indicates start time and end time of executing the access policy. The first device may obtain, by using the policy context in the access policy, a restriction range defined by the management party for the specific environment and restriction time for the specific environment.

It may be understood that a sequence of performing Sim and S102 is not limited in this embodiment of this application. When the second device does not need to select an access policy based on information about the first device, a sequence between S101 and S102 is not limited. For example, when the second device selects access policies based on the restriction content and the restriction level, the second device may perform S102 at any moment before sending the access policy. When the second device needs to select an access policy based on information about the first device, a sequence between S101 and S102 is limited. For example, when the second device selects an access policy based on the restriction range, the restriction target, or the restriction time, the second device may perform S102 after the second device obtains the foregoing information about the first device, where the foregoing information may be obtained through sign-in or connection establishment in S101.

S103: The second device sends the first access policy to the first device.

Specifically, the second device may find the first device based on the information about the first device, and send the first access policy to the first device. The information about the first device may be information obtained by the second device when the first device sends a first request to the second device, or may be information obtained by the second device when the first device establishes a connection to the second device.

A case in which the second device sends the first access policy may include but is not limited to the following two cases:

1. After receiving the first request, the second device automatically triggers sending of the first access policy to the first device.

In this way, the management party does not need to manually send the access policy, and the first device may automatically select and send the access policy after receiving the sign-in request, so that operations of the management party are simplified, and the management party can manage and monitor the user more efficiently and conveniently.

2. After receiving the first request, the second device sends the first access policy after the management party confirms a sending operation.

In this way, the management party may self-determine, based on a sign-in status (for example, a quantity of electronic devices that complete sign-in) of electronic devices, time for sending the access policy.

In some embodiments, when the first device sends the first request to perform sign-in, the first request may carry information about electronic devices associated with the first device. In this way, the second device may send a second access policy to the first device based on the information, and then the first device sends the second access policy to the electronic devices associated with the first device.

The electronic devices associated with the first device may be electronic devices such as a smart band and a smart watch that establish a Bluetooth connection or a network connection to the first device, or that log in to a same account as the first device.

The second access policy and the first access policy may be a same access policy. In this case, the second device does not distinguish between the first device and the electronic devices associated with the first device, and sends the same access policy to restrict functions of the first device and the electronic devices associated with the first device. Alternatively, the second access policy may be different from the first access policy. In this case, the second device may select different access policies for different devices to restrict functions of different devices.

In this embodiment of this application, the electronic devices associated with the first device may alternatively be a third device.

In some embodiments, the second device may select some electronic devices from the electronic devices associated with the first device, and indicate the first device to send the second access policy to the some electronic devices, or the second device directly sends the second access policy to the electronic devices associated with the first device.

In some other embodiments, after the first device receives the second access policy, the first device may select some electronic devices from the devices associated with the first device, and send the second access policy to the some electronic devices.

In this way, when the user has a plurality of electronic devices in the specific environment, the user needs to use only one of the electronic devices for sign-in, and the plurality of electronic devices can simultaneously obtain an access policy corresponding to the specific environment. This avoids repeated sign-in by the user, and improves user experience.

For details about the case in which the second device sends the access policy, refer to the user interface shown in FIG. 6B and related descriptions thereof.

Phase 2: Execute the Access Policy

Step S104 and step S105 are two optional steps. When performing step S104, the first device does not perform step S105; on the contrary, when performing step S105, the first device does not perform step S104.

S104: The first device executes the first access policy.

Executing the first access policy means that the first device refuses to execute a restricted function corresponding to the first access policy, or the first device executes only an executable function corresponding to the first access policy.

Specifically, the first device generates a first access request used to perform a first function. The first device determines whether functions that can be performed by the first device and that are indicated by the first access policy include the first function, and if yes, the first device performs the first function; or the first device determines whether functions that cannot be performed by the first device and that are indicated by the first access policy include the first function, and if yes, the first device refuses to perform the first function.

The first access request is an access request that is generated by the first device for accessing a resource, data, or a capability when a function of an application in the first device is enabled.

That the first device generates the first access request may include but is not limited to the following two cases:

1. The first device generates the first access request based on a user operation.

The user operation is an operation that the user performs on an application in the first device and enables a function of the application. For example, if the user operation is a tap operation of opening a photographing application, the first access request is an access request for accessing a photographing function.

Referring to FIG. 4E, the user operation may be the user operation (for example, a tap operation) performed on the photographing control 412A. The first access request may be an access request for turning on a camera.

2. The first device autonomously generates the first access request.

The first access request autonomously generated by the first device may be an access request generated for accessing a resource, data, or a capability when the first device automatically enables a function of an application without receiving a user operation, for example, an access request generated by the first device for accessing a speaker during caller ID display.

That the first device executes the first access policy may include but is not limited to the following two cases:

1. The first device directly executes the first access policy.

For details about a case in which the first device directly executes the first access policy, refer to FIG. 4E, FIG. 4F and related descriptions thereof.

2. The first device prompts the user, and executes the first access policy after user confirmation.

Specifically, after the first device receives the first access policy, the first device receives a first user operation, and the first device executes the first access policy in response to the first user operation.

For details about a case in which the first device prompts the user, and executes the first access policy after user confirmation, refer to FIG. 4E, FIG. 4G, and related descriptions thereof.

In some embodiments, the first device may determine, based on the restriction factor for the specific environment, whether to directly execute the first access policy or to prompt the user, and execute the first access policy after user confirmation. The restriction level is used as an example. When the restriction level for the specific environment is relatively high, the first device may directly execute the first access policy after receiving the first access policy; or when a current restriction level is relatively low, the first device may prompt the user after receiving the first access policy, and execute the first access policy after user confirmation. Similarly, the restriction target is used as an example. If the restriction target is an identity of a login user of an electronic device, when the identity of the login user is a teacher, the first device may prompt the user after receiving the first access policy, and execute the first access policy after user confirmation; or when the identity of the login user is a student, the first device may directly execute the first access policy after receiving the first access policy. In this way, for different electronic devices, different management strength may exist.

In a specific example, the first device may determine, by checking whether a subject and an object of the first access policy respectively correspond to an application initiated by the first access request and an accessed resource, accessed data, and an accessed capability, whether the first access policy includes a restriction on the first access request. In addition, that the first device executes the first access policy may mean that the first device views a constraint action of the first access policy to determine whether to execute the first access request. If the constraint action is "accept", it indicates that the first device accepts the access request, and the first device accesses, in response to the access request, a resource, data, or a capability that the first device requests to access, and runs a corresponding function of the first device. If the constraint action is "refuse", it indicates that the first device refuses the access request, and the first device discards or does not respond to the access request.

In some embodiments, after receiving the first access policy, the first device may store the first access policy. In this way, when the first device enters the specific environment again, the first device may directly execute the first access policy obtained previously.

In some embodiments, the first access policy may include execution duration. The execution duration is duration of executing the access policy in an electronic device of the user. For example, when the execution duration is one hour, the access policy restricts an electronic device that enters the specific environment to one hour. Specifically, after the first device receives the first access policy, the first device starts timing. When timing duration exceeds execution duration of the first access policy, the first device may delete or disable the first access policy, and send, to the second device, a message that the first access policy is invalid.

S105: The first device does not execute the first access policy.

That the first access policy is not executed means that the first device executes a restricted function corresponding to the first access policy, or the first device refuses to execute an executable function corresponding to the first access policy. Alternatively, the access policy executed by the first device is not the first access policy.

Specifically, the first device generates a second access request used to perform a second function. The first device determines whether functions that can be performed by the first device and that are indicated by the first access policy include the second function, and if yes, the first device refuses to perform the second function; or the first device determines whether functions that cannot be performed by the first device and that are indicated by the first access policy include the second function, and if yes, the first device performs the second function. Alternatively, the first device further includes one or more second access policies, where the second access policy is different from the first access policy.

That the first device does not execute the first access policy may include but is not limited to the following two cases:

1. After prompting the user, the first device receives a user operation that the user refuses to execute the first access policy.

Specifically, after the first device receives the first access policy, the first device receives a second user operation, and the first device refuses to execute the first access policy in response to the second user operation.

After the first device receives the user operation that the user refuses to execute the first access policy, the first device may send a message to the second device, where the message may be used to indicate the first device to refuse to execute the first access policy.

2. The first device executes the second access policy.

That the second device executes the second access policy means that the first device has a plurality of access policies, and the second access policy is an access policy that is selected by the first device from the plurality of access policies and that is applicable to the first access request.

The plurality of access policies in the first device include access policies locally stored in the first device and the first access policy obtained through sign-in. The plurality of access policies include conflicting access policies.

The conflicting access policies mean that two access policies restrict a same access request but different constraint actions. For example, for an access request generated by the first device for turning on a camera, if a constraint action of one access policy is "refuse", and a constraint action of the other access policy is "accept", the two access policies are conflicting access policies.

Specifically, the first device selects the second access policy from the plurality of access policies based on a policy rule, and executes the second access policy.

The policy rule includes but is not limited to the following four cases:

1. Refuse priority: The first device preferentially selects an access policy whose constraint action is "refuse" for execution.

2. Allow priority: The first device preferentially selects an access policy whose constraint action is "accept" for execution.

3. Majority election: The first device selects one access policy from access policies with a largest proportion for execution based on a proportion of "refuse" and "accept" in constraint actions of the plurality of access policies.

4. User decision: The first device executes a corresponding access policy based on user selection. Specifically, the first device may return the prompt information and prompt the user to select an access policy for execution.

It may be understood that there may alternatively be another policy rule. This is not limited in this embodiment of this application.

In some embodiments, a policy rule followed by the first device may be selected by the second device. Specifically, before the first device executes the first access policy or refuses to execute the first access policy, the second device may send the policy rule to the first device, and the first device selects one access policy from the plurality of access policies based on the policy rule. For example, when the second device indicates the first device to select an access policy based on the refuse priority, the first device chooses, for conflicting access policies with a same access request, to refuse the access request.

S106: The first device sends an execution status to the second device.

The execution status is a status in which the first device executes the access policy. The execution status may include two types: an execution-refused state and an executed state. The execution-refused state means that the first device refuses to execute the access policy, and the executed state means that the first device accepts execution of the access policy.

In some embodiments, the executed state may alternatively include the access policy executed by the first device. In this way, the second device may determine whether the access policy that the first device refuses to execute is the first access policy corresponding to the specific environment, or the second device may determine whether the access policy that is accepted by the first device for execution is the first access policy corresponding to the specific environment.

In some embodiments, the second device may send first prompt information again after receiving the execution status in which the first device refuses to execute the first access policy, to prompt the first device to execute the first access policy. Alternatively, the second device outputs information about the first device, so that the management party performs a further operation, for example, oral warning.

In some embodiments, the second device may alternatively receive execution statuses of the electronic devices associated with the first device. Specifically, the electronic devices associated with the first electronic device send the execution statuses of the access policies to the first device, and the first device forwards the execution statuses of the access policies to the second device. When the second device receives the execution statuses in which the electronic devices associated with the first device refuse to execute the access policies, the second device may output information about the electronic devices that refuse to execute the access policies, or send prompt information to the electronic devices that refuse to execute the access policy, and prompt the electronic devices to execute the access policies.

In this way, the second device may view an access policy executed by an electronic device in the specific environment, to better manage and monitor a restriction of the electronic device in the specific environment.

For details about a change of the user interface of the second device when the first device sends the execution status to the second device, refer to the user interfaces shown in FIG. 6B and FIG. 6C and related descriptions thereof.

Phase 3: Delete or Disable the Access Policy.

S107: The first device signs out.

Sign-out means that the second device sends first feedback information to the first device, and the electronic device performs sign-out based on the information, or the access policy becomes invalid, and a function of the electronic device is no longer restricted by the specific environment.

The sign-out may include but is not limited to the following two manners:

1. Manual Sign-Out

The first device may actively send a second request to the second device by using a sign-in application, verification information, or the like, and the second device sends the first feedback information to the first device in response to the second request, to complete sign-out.

Figure 4I:
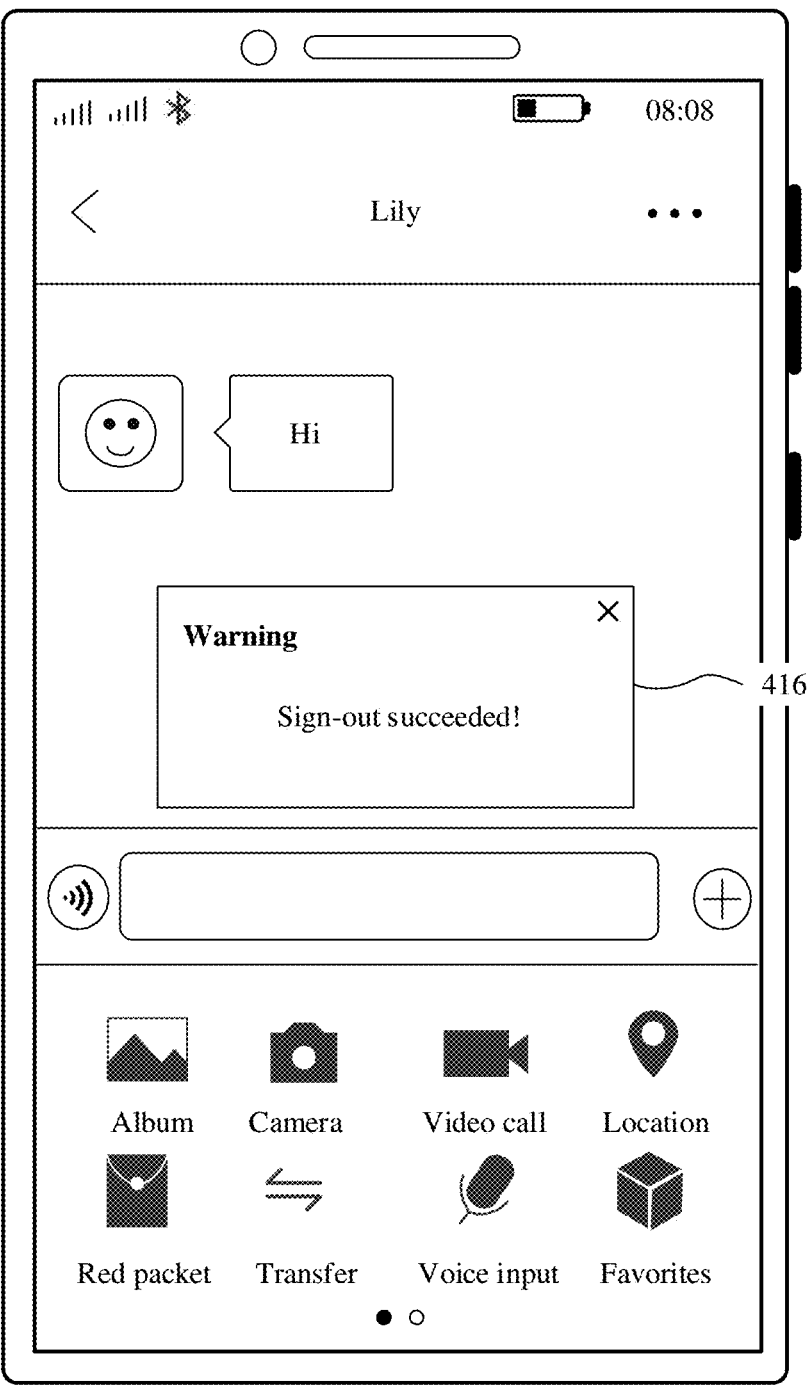

For details about the manual sign-out manner, refer to the user interfaces shown in FIG. 4H and FIG. 4I and related descriptions thereof.

2. Automatic Sign-Out

Automatic sign-out means that the first device does not need to actively initiate a sign-out request to the second device, and the second device directly sends the first feedback information to the first device, to complete sign-out. Alternatively, the access policy executed by the first device automatically becomes invalid. For example, when the second device detects that duration in which the first device obtains the first access policy reaches a time threshold, the second device actively sends the first feedback information to the first device. For another example, the first access policy carries valid duration, and when duration in which the first device obtains the first access policy reaches the valid duration, the first device automatically signs out; or the first access policy carries a valid area, and when the first device leaves a range restricted by the valid area, the first device automatically signs out.

In this embodiment of this application, the time threshold may alternatively be first duration, the valid duration may alternatively be second duration, and the valid area may alternatively be a first area.

For details about the automatic sign-out manner, refer to the user interface shown in FIG. 5B and related descriptions thereof.

It may be understood that, the sign-out manner of the first device is also applicable to the sign-out manner of the electronic devices associated with the first device. For details about the sign-out manner of the electronic devices associated with the first device, refer to the sign-out manner of the first device. Details are not described herein again.

In some embodiments, the second device may update and maintain a sign-in list. After the first device successfully signs out, the second device may delete the information about the first device from the sign-in list.

Figure 6F:
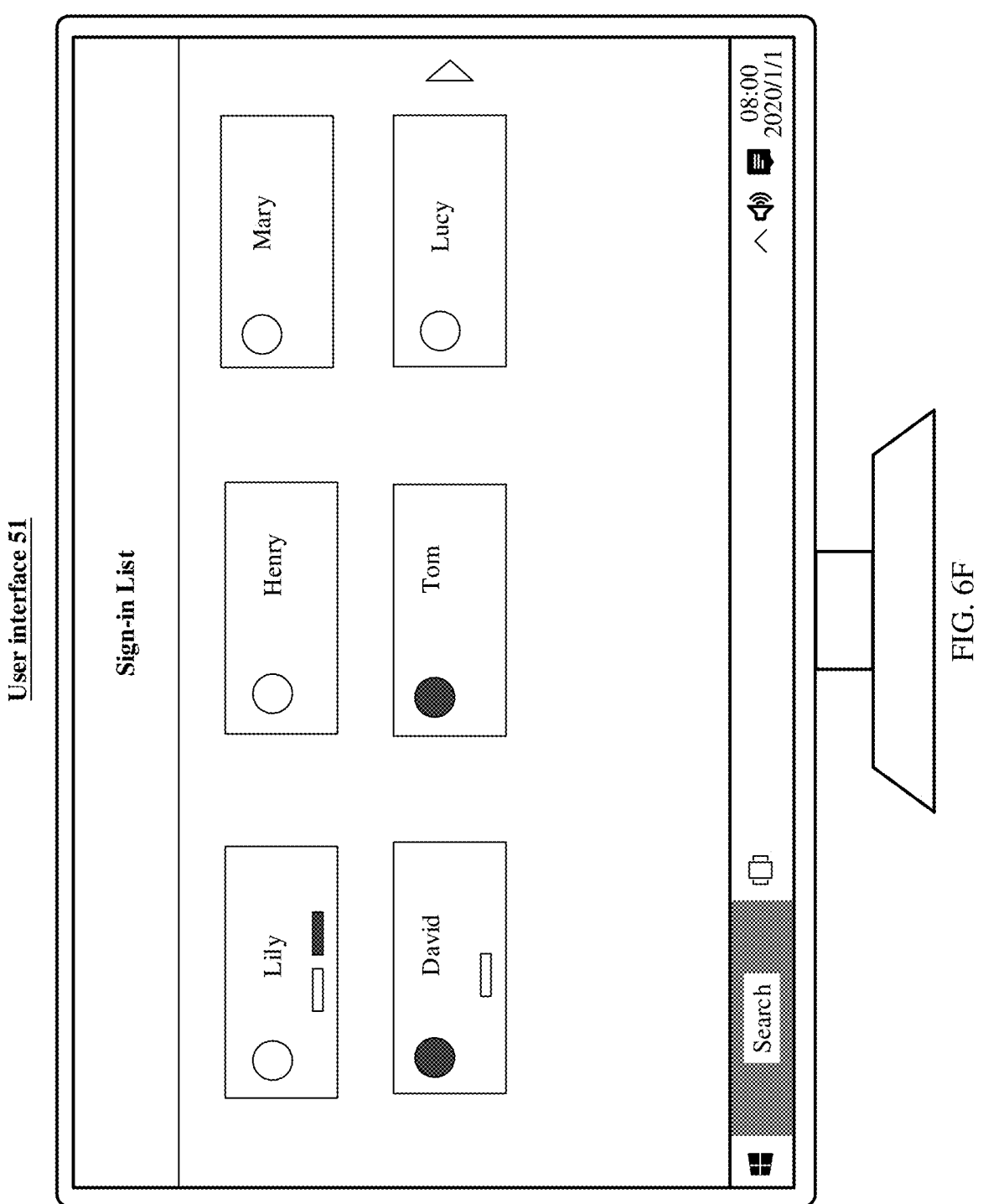

For details about a change of the user interface of the second device when the first device signs out, refer to the user interfaces shown in FIG. 6E and FIG. 6F and related content thereof.

S108: The first device deletes or disables the first access policy.

The first device may cancel, by deleting the first access policy, a restriction of the second device on the function of the first device. When the first device enters the specific environment managed and monitored by the second device again, the first device may obtain a corresponding access policy again through sign-in.

The first device may cancel, by disabling the first access policy, a restriction of the second device on the function of the first device. When the first device enters the specific environment managed and monitored by the second device again, the first device may directly execute the first access policy after completing sign-in, and does not need to obtain the access policy again.

In some embodiments, the third device may also self-delete or self-disable the second access policy after the third device signs out in the sign-out manner of the first device.

In some embodiments, after the first device deletes or disables the first access policy, the first device may notify the electronic devices associated with the first device to delete or disable the second access policy.

The access control method provided in this embodiment of this application may be applied to a company conference scenario. In this case, a specific environment may be a conference room, and an access requirement for the specific environment may be no photographing, no voice recording, or no video recording. A management party device is a server of a company, an access policy corresponding to the access requirement is configured in the server, and a user device is an electronic device such as a mobile phone or a tablet carried by a company employee when entering the conference room. After the company employee enters the conference room and signs in, the electronic device carried by the company employee receives the access policy sent by the server. In this case, the electronic device of the company employee is restricted by the access policy. That is, the company employee cannot use the electronic device to implement functions such as photographing, voice recording, and video recording; alternatively, when the company employee uses the electronic device to take a photo, record a voice, or record a video, prompt information is displayed in the electronic device to prompt the company employee to comply with the access requirement of the electronic device in the conference room. After the conference ends, the company employee can use the electronic device to perform sign-out, to remove a restriction of the access policy on the electronic device.

The access control method provided in this embodiment of this application may be further applied to a boarding scenario. In this case, a specific environment may be an airplane cabin, an access policy for the specific environment may be no access to a network. A management party device is a server, the access policy corresponding to the access requirement is configured in the server, and a user device is an electronic device such as a mobile phone or a tablet carried by a passenger. After the passenger boards a plane and signs in, the electronic device carried by the passenger receives the access policy sent by the server. In this case, the electronic device of the passenger is restricted by the access policy. That is, the passenger cannot use the electronic device to implement a function that needs to access a network, such as web browsing or video watching online; alternatively, when the passenger uses the electronic device to implement a function that needs to access a network, such as web browsing or video watching online, prompt information is displayed in the electronic device to prompt the passenger to comply with the access requirement that the electronic device is forbidden to access a network in the cabin. After the journey ends, the passenger can use the electronic device to perform sign-out, to remove a restriction of the access policy on the electronic device.

The access control method provided in this embodiment of this application may be further applied to a teaching scenario. In this case, a specific environment may be a range of a classroom, and an access policy for the specific environment may be that a student is allowed to use teaching-related applications such as a document, a browser, and a teaching assistant. A management party device is an electronic device (for example, a mobile phone or a computer) carried by a teacher, the access policy corresponding to the access requirement is configured in the electronic device carried by the teacher, and a user device is an electronic device such as a mobile phone or a tablet carried by the student. After the student enters the classroom and signs in, the electronic device carried by the student receives the access policy sent by the electronic device carried by the teacher. In this case, the electronic device of the student is restricted by the access policy, and the student can use only teaching-related applications; alternatively, when the student uses an application (for example, an entertainment application) irrelevant to teaching, prompt information is displayed in the electronic device of the student to prompt the student to comply with the class access requirement. After the course ends, the student can use the electronic device to perform sign-out, to remove a restriction of the access policy on the electronic device.

The access control method provided in this embodiment of this application may be further applied to a driving scenario of a driver. In this case, a specific environment may be an environment in which a vehicle is located, and an access policy for the specific environment may be that a call application is forbidden to use. A management party device is a vehicle-mounted terminal, the access policy corresponding to the access requirement is configured in the vehicle-mounted terminal, and a user device is an electronic device such as a mobile phone or a tablet carried by the driver. After the driver enters a cab in the vehicle, and completes sign-in through a connection established between the electronic device and the vehicle-mounted terminal, the electronic device carried by the driver receives the access policy sent by the vehicle-mounted terminal. In this case, the electronic device of the driver is restricted by the access policy. That is, the driver cannot answer a call; alternatively, when the driver answers a call, prompt information is displayed in the electronic device of the driver to prompt the driver to comply with the driving access requirement. After the driving ends, the driver disconnects the connection between the electronic device and the vehicle-mounted terminal to complete sign-out, to remove a restriction of the access policy on the electronic device.

The access control method provided in this embodiment of this application may be further applied to a public place such as a library or an antique museum. In this case, a specific environment may be an area such as a library or an antique museum, and an access policy for the specific environment may be that an application that has a speaker or has a photographing function is forbidden to use. A management party device is a server, and the access policy corresponding to the access requirement is configured on the server, and a user device is an electronic device such as a mobile phone or a tablet carried by a customer or a visitor. After the user enters the environment in which the library or the antique museum is located and signs in, the electronic device carried by the user receives the access policy sent by the server. In this case, the electronic device of the user is restricted by the access policy. That is, the user is forbidden to use the application that has a speaker or has a photographing function; alternatively, when the application plays sound through a speaker or turns on a camera, prompt information is displayed in the electronic device to prompt the user to comply with the access requirement in the public place. When the user leaves the public place such as a library or an antique museum, the user can perform sign-out to remove a restriction of the access policy on the electronic device.

The access control method provided in this embodiment of this application may be further applied to another scenario. This is not limited in this embodiment of this application.

Figure 8:
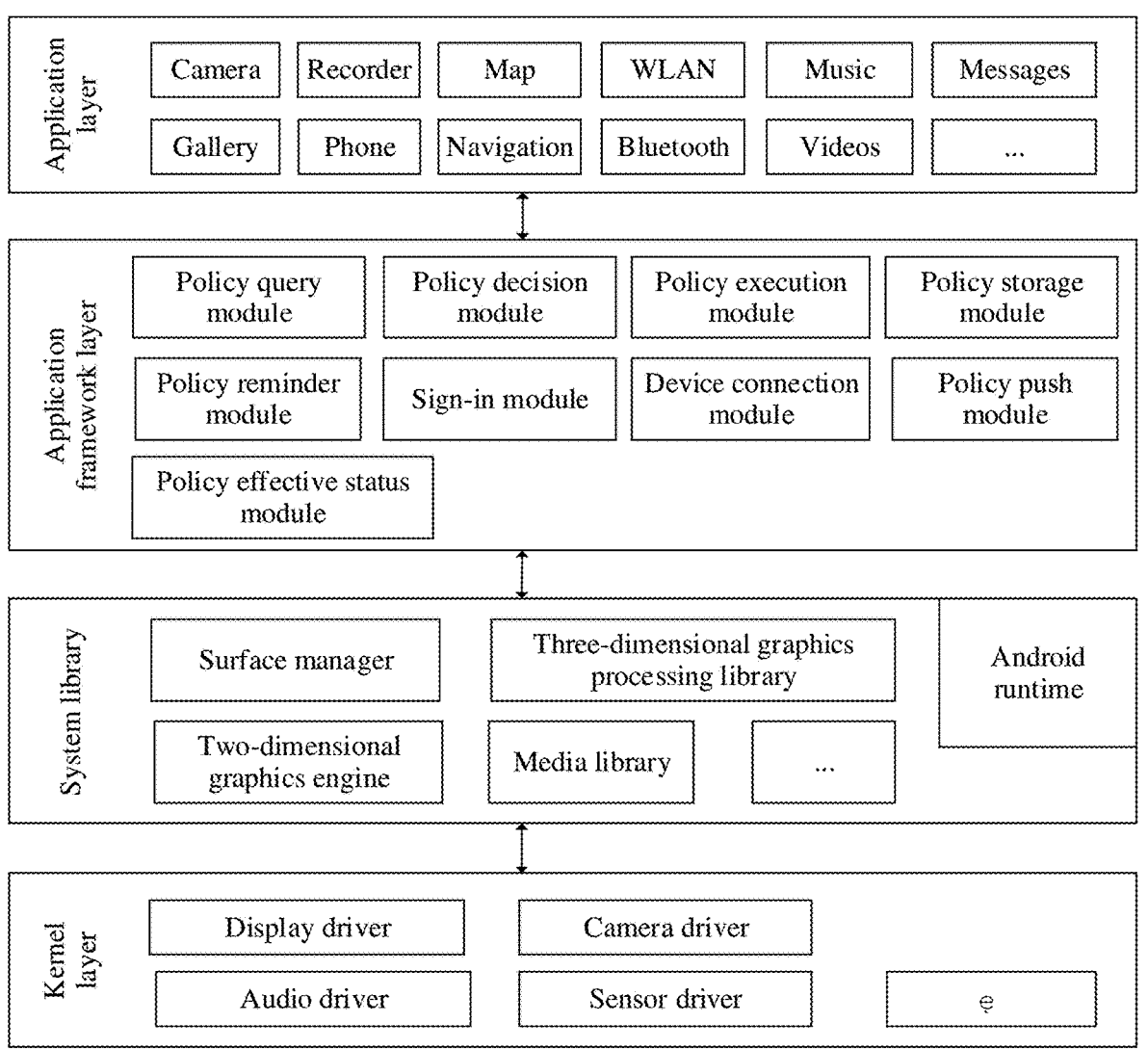
FIG. 8 is a block diagram of a software structure of an electronic device 100 according to an embodiment of this application.

FIG. 8 is a diagram of a software structure of the electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 8, the application packages may include applications such as Recorder, Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 7, the application framework layer may include a policy query module, a policy decision module, a policy execution module, a policy storage module, a policy configuration module, a sign-in module, a device connection module, a policy push module, a policy reminder module, and a policy execution status module.

The policy query module may be configured to query an access policy applicable to an access request.

The policy decision module may be configured to select an appropriate access policy from the access policies queried in the policy query module.

The policy execution module may be configured to execute an access policy, and determine whether to accept or refuse an access request. If the access request is accepted, the electronic device 100 accesses, in response to the access request, a resource, data, or a capability that are requested by the access request. If the access request is refused, the electronic device 100 discards or does not respond to the access request.

The policy storage module may be configured to store an access policy obtained by the electronic device 100. The access request includes an access policy obtained by the electronic device 100 through sign-in and an access policy existing in the electronic device 100.

The policy configuration module may be configured by the electronic device 100 to locally configure an access policy.

The sign-in module may be configured to complete sign-in and sign-out of the electronic device 100, and delete or disable, after the electronic device 100 signs out, an access policy obtained during sign-in.

The device connection module may be configured to connect the electronic device 100 to the management party device.

The policy push module may be configured to receive an access policy sent by the management party device.

The policy reminder module may be configured to prompt the user to execute an access policy.

In some embodiments, the policy reminder module may be further configured to prompt the user again to execute the access policy when the user refuses to execute the access policy.

The policy execution status module may be configured to manage and maintain a status of executing the access policy by the electronic device 100, and send the status of executing the access policy by the electronic device 100 to the management party device.

In some embodiments, the policy query module, the policy decision module, the policy execution module, the policy storage module, the sign-in module, the device connection module, the policy push module, the policy reminder module, and the policy execution status module may be implemented at the application layer or a service layer.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 9:
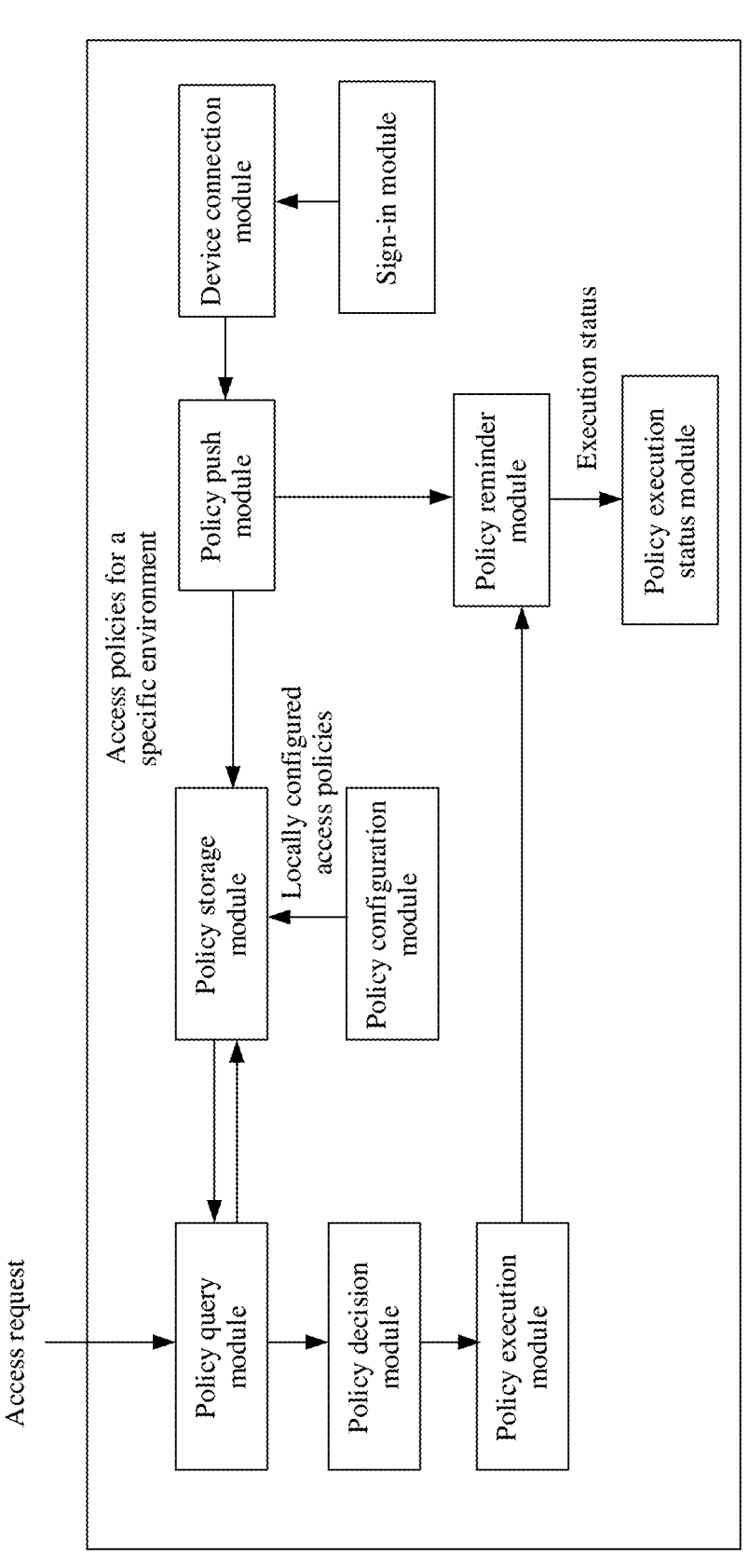
FIG. 9 is a schematic diagram of an example of an information flow according to an embodiment of this application.

For example, with reference to the software architecture diagram shown in FIG. 8, FIG. 9 is a schematic diagram of an example of an information flow according to an embodiment of this application.

FIG. 9 is a schematic diagram of an example of an information flow in which the electronic device 100 obtains, when entering a specific environment, access policies sent by the management party device through sign-in, searches for access policies applicable to the access request after an access request is generated, determines an appropriate access policy from the searched access policies, and executes the access policy.

The sign-in module may accept an operation that the user performs sign-in, or the sign-in module may determine, based on a geographical location of the user, a Bluetooth connection status, a network connection status, or the like, whether the electronic device 100 enters a specific environment managed and monitored by the management party device. When the electronic device 100 enters the specific environment, the sign-in module may automatically complete sign-in.

In response to the sign-in operation of the user, the electronic device 100 establishes a connection between the electronic device 100 and the management party device through the device connection module.

After the electronic device 100 establishes the connection to the management party device, the policy push module may receive the access policy sent by the management party device. In addition, the policy push module may store, in the policy storage module, the access policy obtained by the electronic device 100 through sign-in. The policy configuration module may further send the locally configured access policies to the policy storage module for storage.

The policy reminder module receives the access policy received by the policy push module, returns prompt execution information, to prompt the user to execute the access policy.

The policy execution status module receives a prompt result obtained by the policy prompt module, where the prompt result may include: "refuse" and "accept". "Refuse" indicates that the user refuses to execute an access policy, and "accept" indicates that the user accepts execution of an access policy. The policy execution status may send, to the management party device, a status of accepting or refusing execution of the access policy by the electronic device 100.

The electronic device 100 may generate an access request based on a user operation. After receiving the access request, the policy query module may search, based on the access request, the policy storage module for the stored access policies, and find an access policy applicable to the access request.

The policy decision module may determine, based on a policy rule, the most appropriate access policy from access policies searched in the policy query module, and determine the most appropriate access policy as the access policy executed by the electronic device 100.

The policy execution module may determine, based on a constraint action of the access policy found in the policy decision module, whether to accept or refuse the access request. If the access request is accepted, the electronic device 100 accesses, in response to the access request, a resource, data, or a capability that are requested by the access request. If the access request is refused, the electronic device 100 discards or does not respond to the access request.

It may be understood that FIG. 9 shows only some software modules in the electronic device 100, and does not constitute a limitation on the software architecture of the electronic device 100.

Figure 10:
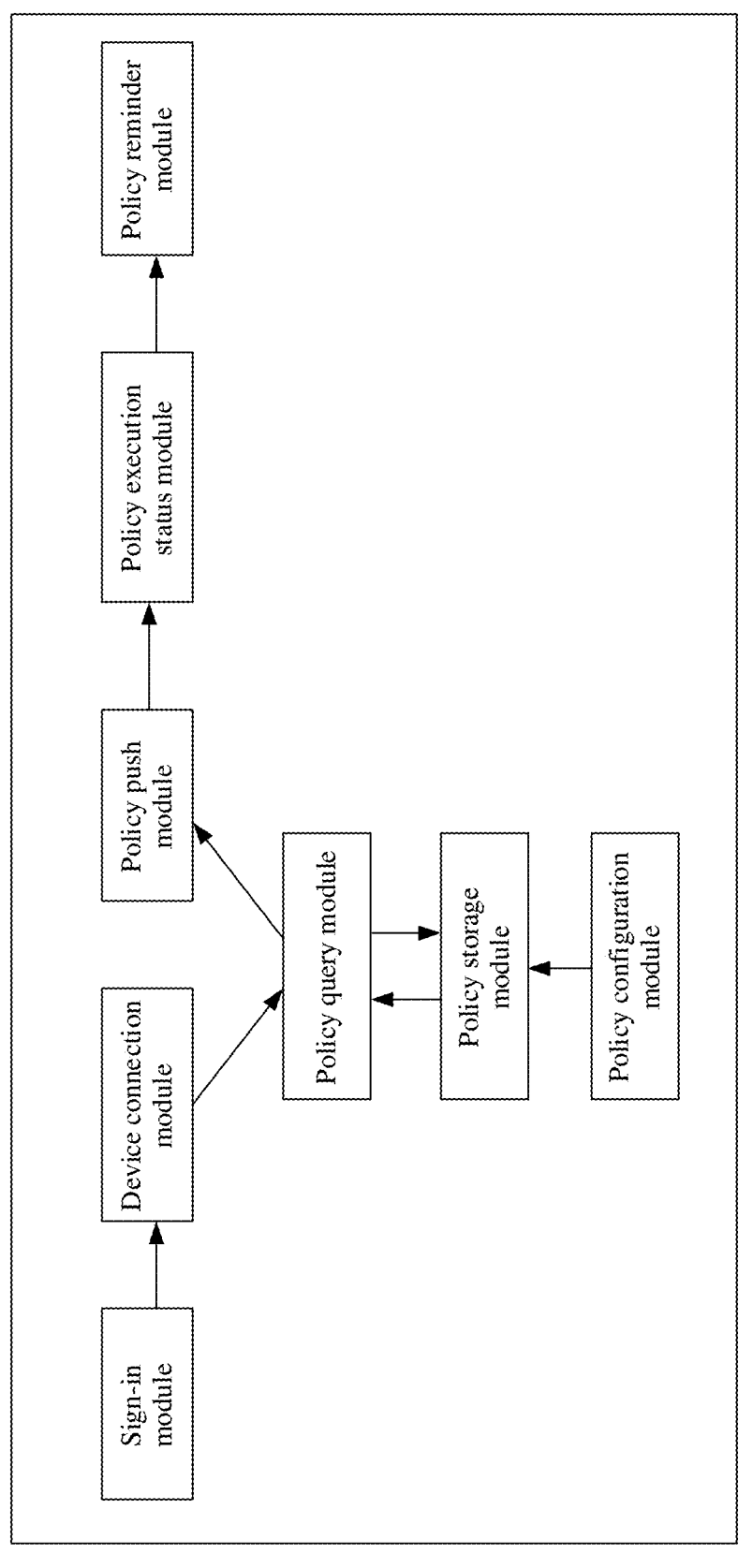
FIG. 10 is a block diagram of a software structure of an electronic device 200 according to an embodiment of this application.

FIG. 10 shows a schematic diagram of a software structure of an example of an electronic device 200 according to an embodiment of this application.

The software structure of the electronic device 200 may include the following modules: a sign-in module, a device connection module, a policy query module, a policy storage module, a policy configuration module, a policy push module, a policy execution status module, and a policy reminder module.

The sign-in module is configured to receive a first request sent by the electronic device, and manage the electronic device that performs sign-in.

The device connection module is configured to establish a connection between an electronic device managed and monitored by the electronic device 200 and the electronic device 200.

The policy query module is configured to select an access policy from the policy storage module based on a restriction factor.

The policy storage module is configured to store an access policy configured by the electronic device 200.

The policy configuration module is configured to configure an access policy for a specific environment based on a restriction factor.

The policy push module is configured to send, to an electronic device that performs sign-in, the access policy selected by the electronic device 200.

The policy execution status module is configured to manage and update a status of executing the access policy by the electronic device that receives the access policy sent by the electronic device 200.

The policy reminder module is configured to prompt an electronic device that does not execute the access policy to execute the access policy again.

It may be understood that FIG. 10 shows only some software modules in the electronic device 200, and does not constitute a limitation on the software architecture of the electronic device 100.

The implementations of this application may be randomly combined to achieve different technical effects.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure and functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A method, comprising:

receiving, by a second device, a first request sent by a first device, the first request carries information about a third device;

selecting, by the second device, a first access policy from a plurality of access policies based on: a device type of the first device and at least one of: restriction levels set by the second device for a first environment, restriction categories for functions of electronic devices in the first environment, a login user of the first device, a time point at which the second device receives the first request, or an area in which the first device is located in the first environment;

sending, by the second device, the first access policy to the first device in response to the first request; and in response to the first request carrying the information about the third device, sending, by the second device, a second access policy to the third device through the first device, wherein whether the second access policy and the first access policy are a same access policy or the second access policy and the first access policy are different access policies is determined based on the device type of the first device and a device type of the third device.

2. The method according to claim 1, wherein after the sending, by the second device, the first access policy to the first device, the method further comprises:

receiving, by the second device, a second request sent by the first device; and sending, by the second device, first feedback information to the first device in response to the second request or sending the first feedback information to the first device after a first duration after sending the first access policy to the first device, wherein the first device deletes or disables the first access policy in response to the first feedback information.

3. The method according to claim 1, further comprising storing, by the second device, the plurality of access policies, wherein the plurality of access policies comprises:

access policies respectively corresponding to a plurality of restriction levels of the first environment;

access policies respectively corresponding to a plurality of restriction categories for the functions of the electronic devices in the first environment;

access policies respectively corresponding to a plurality of device types of the electronic devices in the first environment;

access policies respectively corresponding to a plurality of login users of the electronic devices in the first environment;

access policies respectively corresponding to a plurality of time periods in the first environment; or access policies respectively corresponding to a plurality of areas in the first environment.

4. The method according to claim 1, wherein after the sending, by the second device, the first access policy to the first device, the method further comprises:

receiving, by the second device, an execution status of the first access policy sent by the first device, wherein the execution status of the first access policy comprises: an executed state or an execution-refused state; and when the execution status is the execution-refused state, outputting, by the second device, information about the first device or sending, by the second device, first prompt information to the first device.

5. The method according to claim 2, wherein after the sending, by the second device, the first access policy to the first device, the method further comprises:

receiving, by the second device, an execution status of the first access policy sent by the first device, wherein the execution status of the first access policy comprises: an executed state or an execution-refused state; and when the execution status is the execution-refused state, outputting, by the second device, information about the first device or sending, by the second device, first prompt information to the first device.

6. The method according to claim 3, wherein after the sending, by the second device, the first access policy to the first device, the method further comprises:

receiving, by the second device, an execution status of the first access policy sent by the first device, wherein the execution status of the first access policy comprises: an executed state or an execution-refused state; and when the execution status is the execution-refused state, outputting, by the second device, information about the first device or sending, by the second device, first prompt information to the first device.

7. The method according to claim 1, wherein after the sending, by the second device, the second access policy to the third device through the first device, the method further comprises:

receiving, by the second device, an execution status of executing the second access policy by the third device through the first device, wherein the execution status of the second access policy comprises: an executed state or an execution-refused state; and when the execution status of the second access policy is the execution-refused state, outputting, by the second device, the information about the third device or sending, by the second device, second prompt information to the third device.

8. An electronic device, comprising:

a non-transitory memory; and one or more processors, wherein the non-transitory memory is coupled to the one or more processors, the non-transitory memory is configured to store computer program code, the computer program code comprises computer instructions, and the one or more processors invoke the computer instructions to enable a computer to perform operations including:

receiving a first request sent by a first device, the first request carries information about a second device;

selecting a first access policy from a plurality of access policies based on a device type of the first device and at least one of: restriction levels set by the second device for a first environment, restriction categories for functions of electronic devices in the first environment, a login user of the first device, a time point at which the second device receives the first request, or an area in which the first device is located in the first environment;

sending the first access policy to the first device in response to the first request; and in response to the first request carrying the information about the second device, sending a second access policy to the second device through the first device, wherein whether the second access policy and the first access policy are a same access policy or the second access policy and the first access policy are different access policies is determined based on the device type of the first device and a device type of the second device.

9. The electronic device according to claim 8, wherein after the sending the first access policy to the first device, the operations further comprise:

receiving a second request sent by the first device; and sending first feedback information to the first device in response to the second request or sending the first feedback information to the first device after a first duration after sending the first access policy to the first device, wherein the first device deletes or disables the first access policy based on the first feedback information.

10. The electronic device according to claim 8, wherein the non-transitory memory stores the plurality of access policies, and the plurality of access policies comprises one or more of:

access policies respectively corresponding to a plurality of restriction levels of the first environment;

access policies respectively corresponding to a plurality of restriction categories for the functions of the electronic devices in the first environment;

access policies respectively corresponding to a plurality of device types of the electronic devices in the first environment;

access policies respectively corresponding to a plurality of login users of the electronic devices in the first environment;

47 access policies respectively corresponding to a plurality of time periods in the first environment; or access policies respectively corresponding to a plurality of areas in the first environment.

11. The electronic device according to claim 8, wherein after the sending the first access policy to the first device, the operations further comprise:

receiving an execution status of the first access policy sent by the first device, wherein the execution status of the first access policy comprises: an executed state or an execution-refused state; and when the execution status is the execution-refused state, outputting information about the first device or sending first prompt information to the first device.

12. The electronic device according to claim 9, wherein after the sending the first access policy to the first device, the operations further comprise:

receiving an execution status of the first access policy sent by the first device, wherein the execution status of the first access policy comprises: an executed state or an execution-refused state; and when the execution status is the execution-refused state, outputting information about the first device or sending first prompt information to the first device.

13. The electronic device according to claim 10, wherein after the sending the first access policy to the first device, the operations further comprise:

receiving an execution status of the first access policy sent by the first device, wherein the execution status of the first access policy comprises: an executed state or an execution-refused state; and when the execution status is the execution-refused state, outputting information about the first device or sending first prompt information to the first device.

14. The electronic device according to claim 8, wherein after sending the second access policy to the second device through the first device, the operations further comprise:

receiving an execution status of executing the second access policy by the second device through the first device, wherein the execution status of the second access policy comprises: an executed state or an execution-refused state; and when the execution status of the second access policy is the execution-refused state, outputting the information about the second device or sending second prompt information to the second device.

15. A non-transitory computer-readable storage medium, storing instructions, wherein when the instructions are run on one or more processors of an electronic device, the electronic device is enabled to perform operations including:

receiving a first request sent by a first device, the first request carries information about a second device;

selecting a first access policy from a plurality of access policies based on a device type of the first device and at least one of: restriction levels set by the second device for a first environment, restriction categories for functions of electronic devices in the first environment, a login user of the first device, a time point at which the second device receives the first request, or an area in which the first device is located in the first environment;

sending the first access policy to the first device in response to the first request; and in response to the first request carrying the information about the second device, sending a second access policy to the second device through the first device, wherein whether the second access policy and the first access policy are a same access policy or the second access policy and the first access policy are different access policies is determined based on the device type of the first device and a device type of the second device.

16. The non-transitory computer-readable storage medium according to claim 15, wherein after the sending the first access policy to the first device, the operations further comprise:

receiving a second request sent by the first device; and sending first feedback information to the first device in response to the second request or sending the first feedback information to the first device after a first duration after sending the first access policy to the first device, wherein the first device deletes or disables the first access policy based on the first feedback information.

17. The non-transitory computer-readable storage medium according to claim 15, wherein the non-transitory computer-readable storage medium stores the plurality of access policies, and the plurality of access policies comprises one or more of:

access policies respectively corresponding to a plurality of restriction levels of the first environment;

access policies respectively corresponding to a plurality of restriction categories for the functions of the electronic devices in the first environment;

access policies respectively corresponding to a plurality of device types of the electronic devices in the first environment;

access policies respectively corresponding to a plurality of login users of the electronic devices in the first environment;

access policies respectively corresponding to a plurality of time periods in the first environment; or access policies respectively corresponding to a plurality of areas in the first environment.

18. The non-transitory computer-readable storage medium according to claim 15, wherein after the sending the first access policy to the first device, the operations further comprise:

receiving an execution status of the first access policy sent by the first device, wherein the execution status of the first access policy comprises: an executed state or an execution-refused state; and when the execution status is the execution-refused state, outputting information about the first device, or sending first prompt information to the first device.

19. The non-transitory computer-readable storage medium according to claim 16, wherein after the sending the first access policy to the first device, the operations further comprise:

receiving an execution status of the first access policy sent by the first device, wherein the execution status of the first access policy comprises: an executed state or an execution-refused state; and when the execution status is the execution-refused state, outputting information about the first device or sending first prompt information to the first device.

20. The method according to claim 1, the selecting comprising selecting the first access policy based on the device type of the first device, the restriction levels, the restriction categories, the login user of the first device, the time point at which the second device receives the first request, and the area in which the first device is located in the first environment, the second device sending the second access policy to the third device through the first device in response to both the first request requesting to perform sign-in and the first request carrying the information about the third device, and the third device logging in to a same account as the first device.

\* \* \* \* \*